Figure 36:
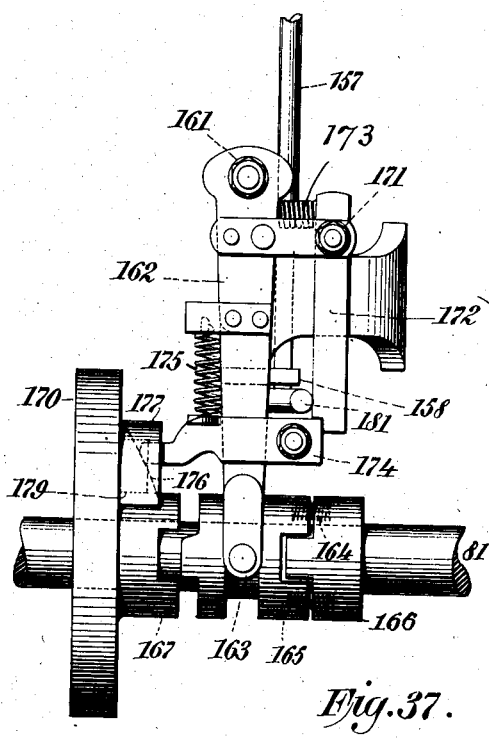

No. 834,050. PATENTED OCT. 23, 1906.
W. D. FERRIS.
BALE TIE MAKING MACHINE.
APPLICATION FILED NOV. 6, 1905.
15 SHEETS—SHEET 1.
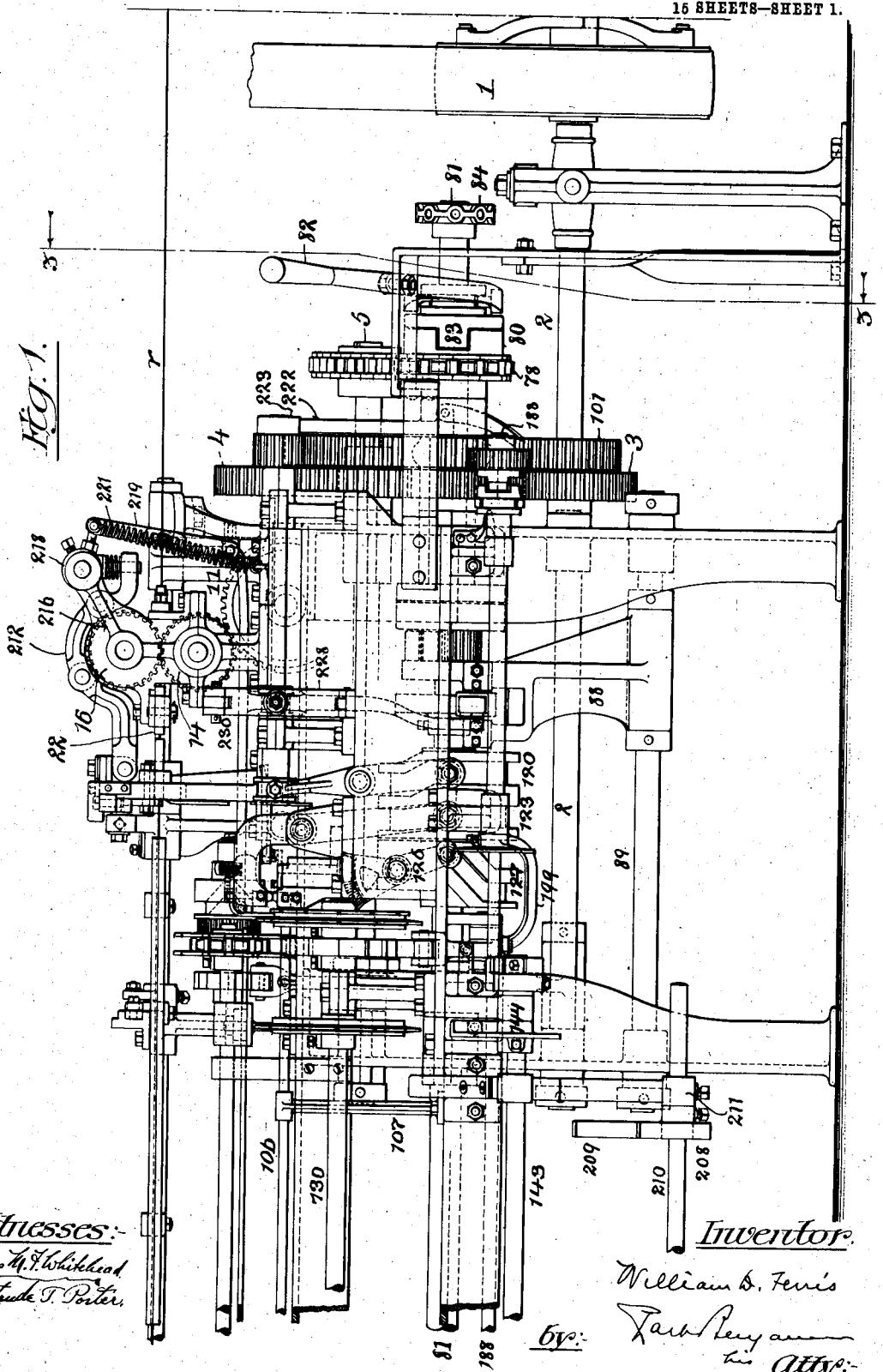

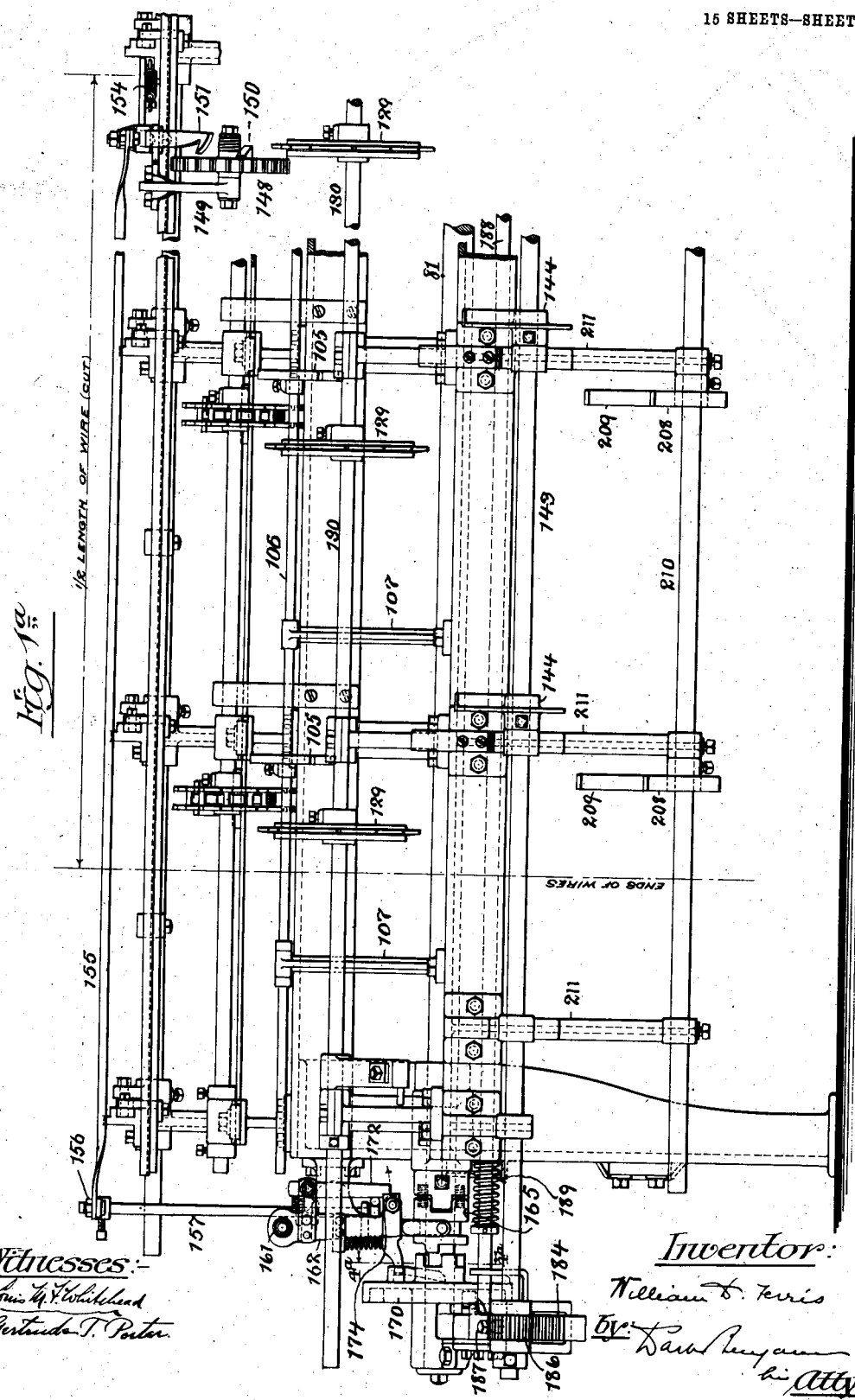

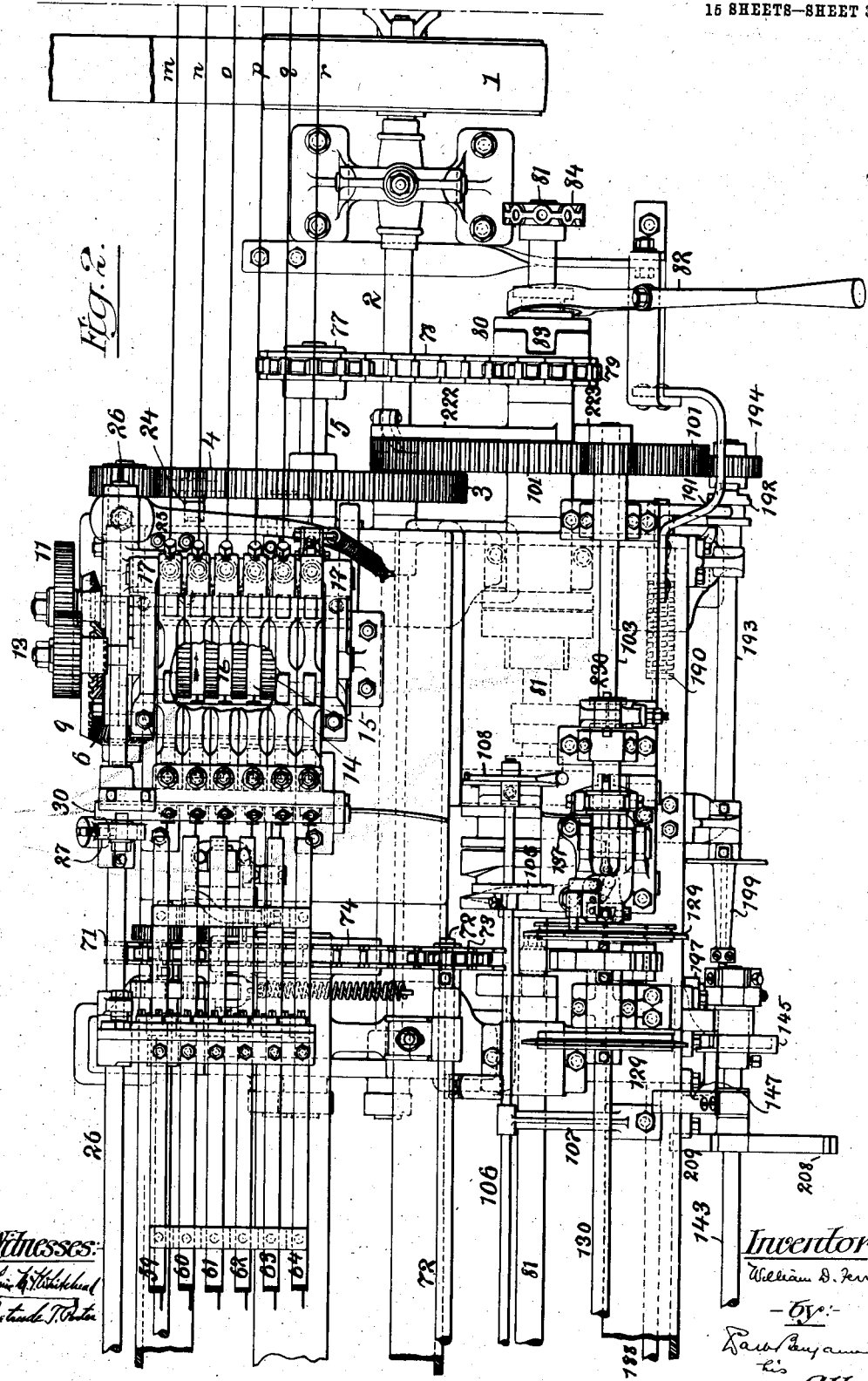

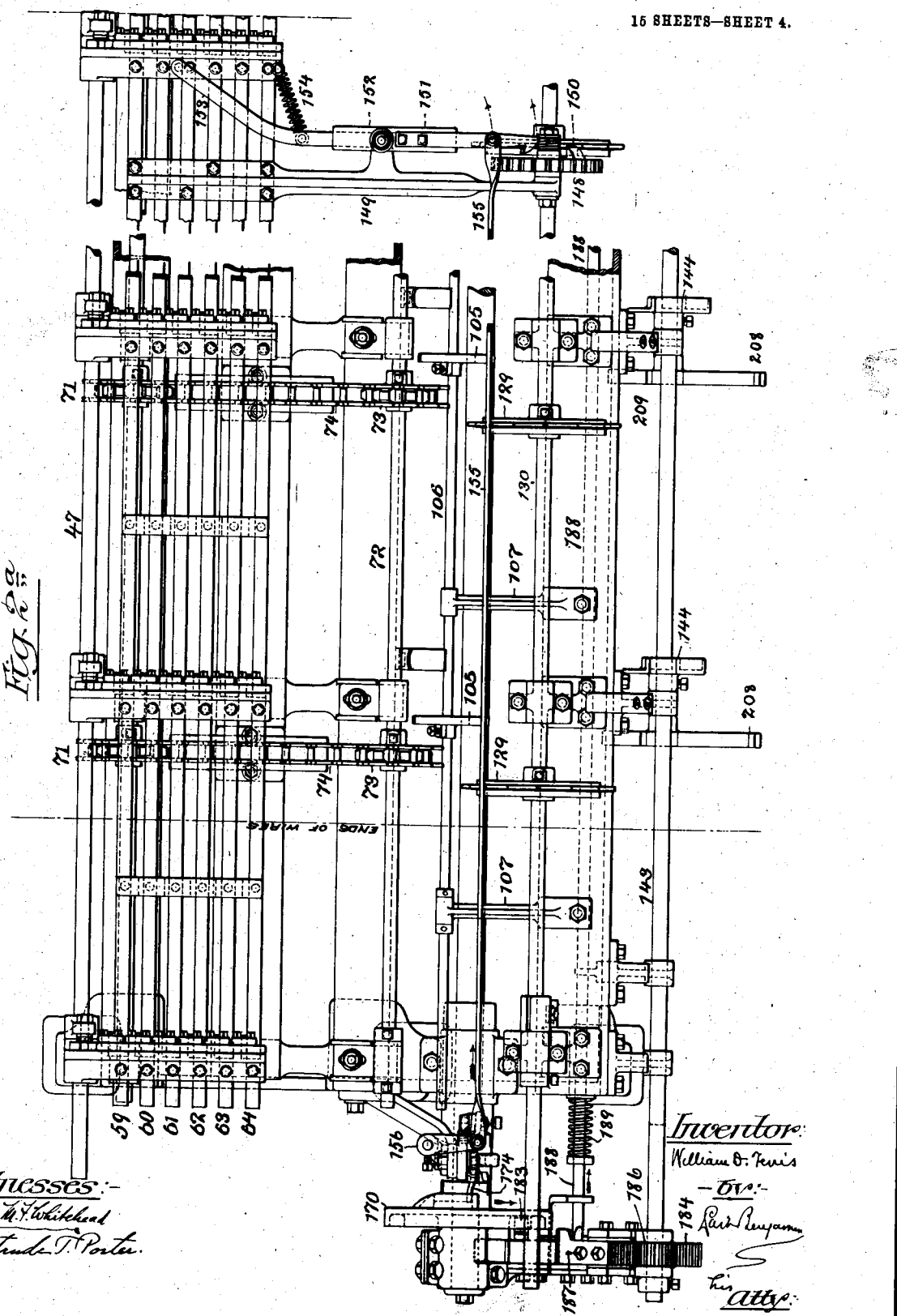

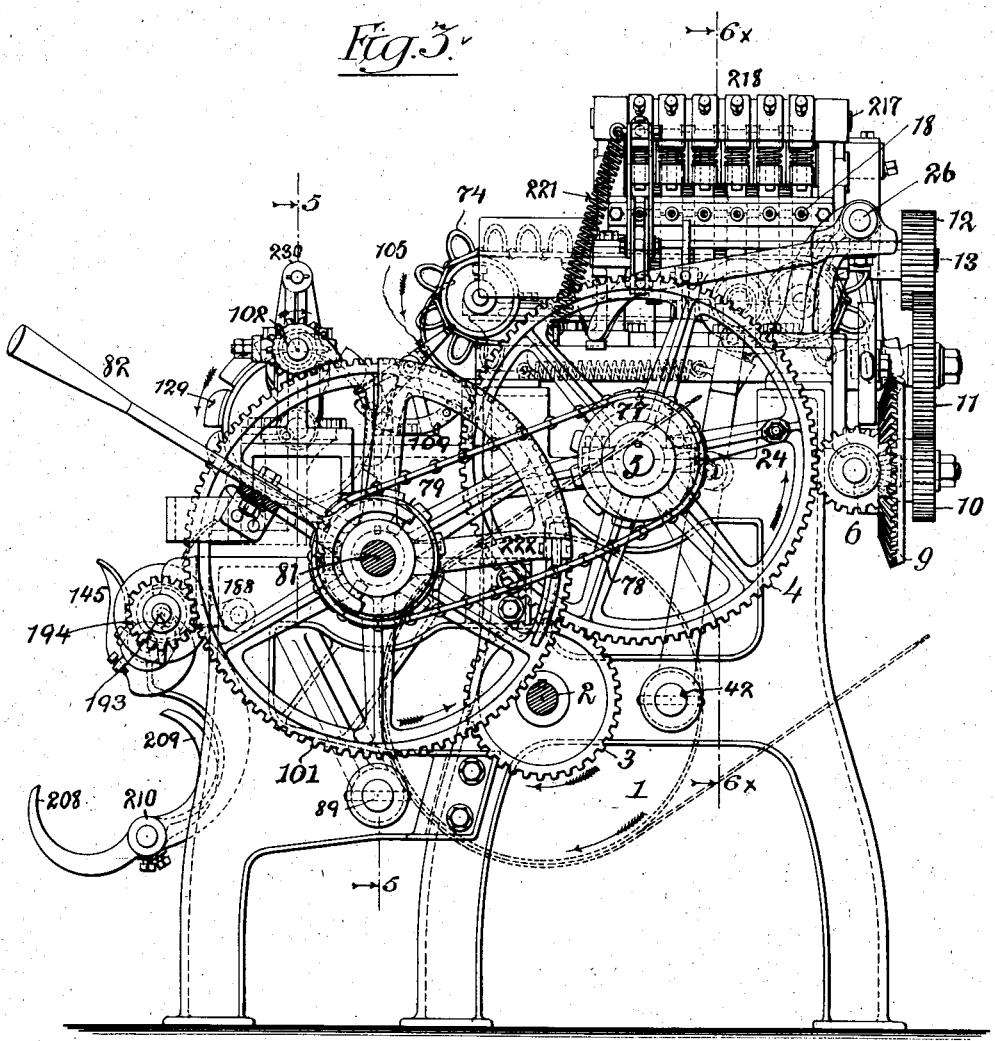

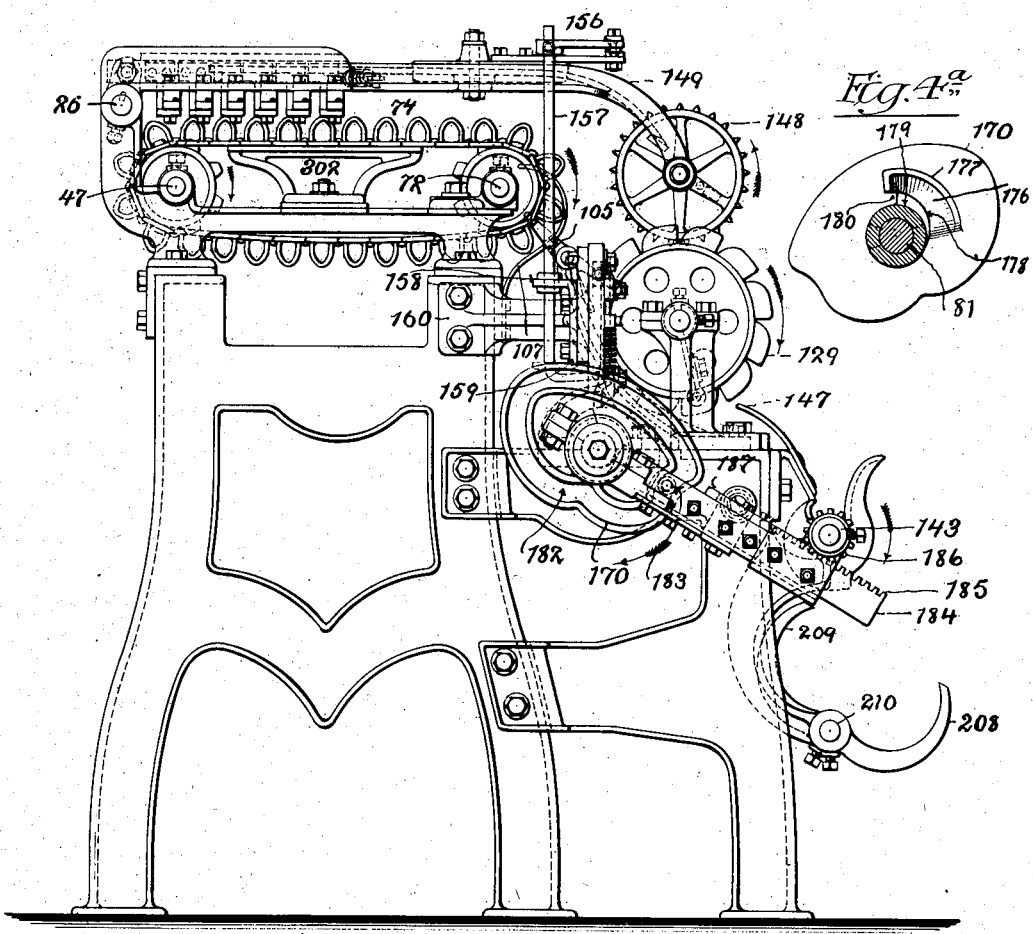

No. 834,050. PATENTED OCT. 23, 1906.
W. D. FERRIS.
BALE TIE MAKING MACHINE.
APPLICATION FILED NOV. 6, 1905.
15 SHEETS—SHEET 7.
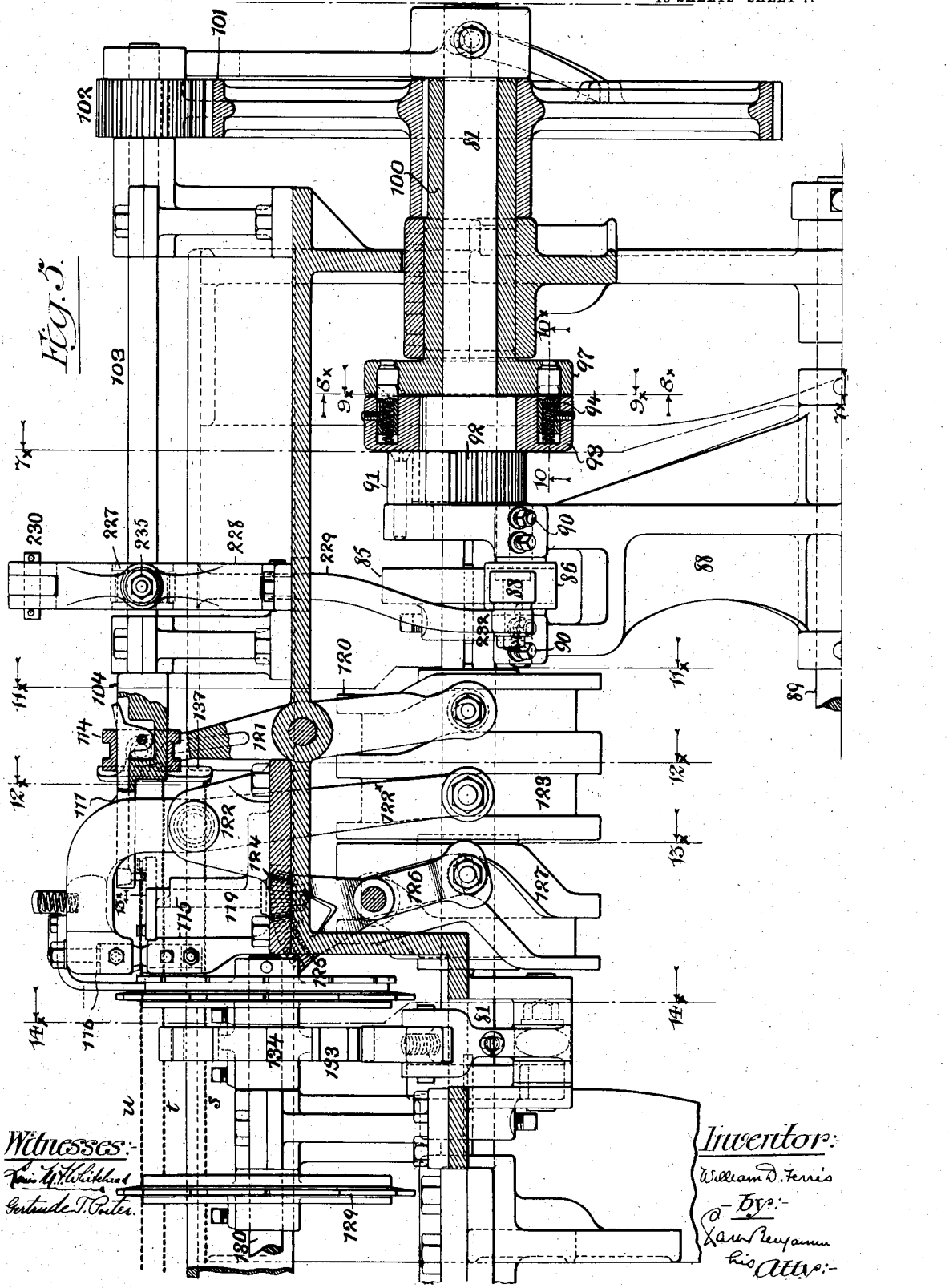

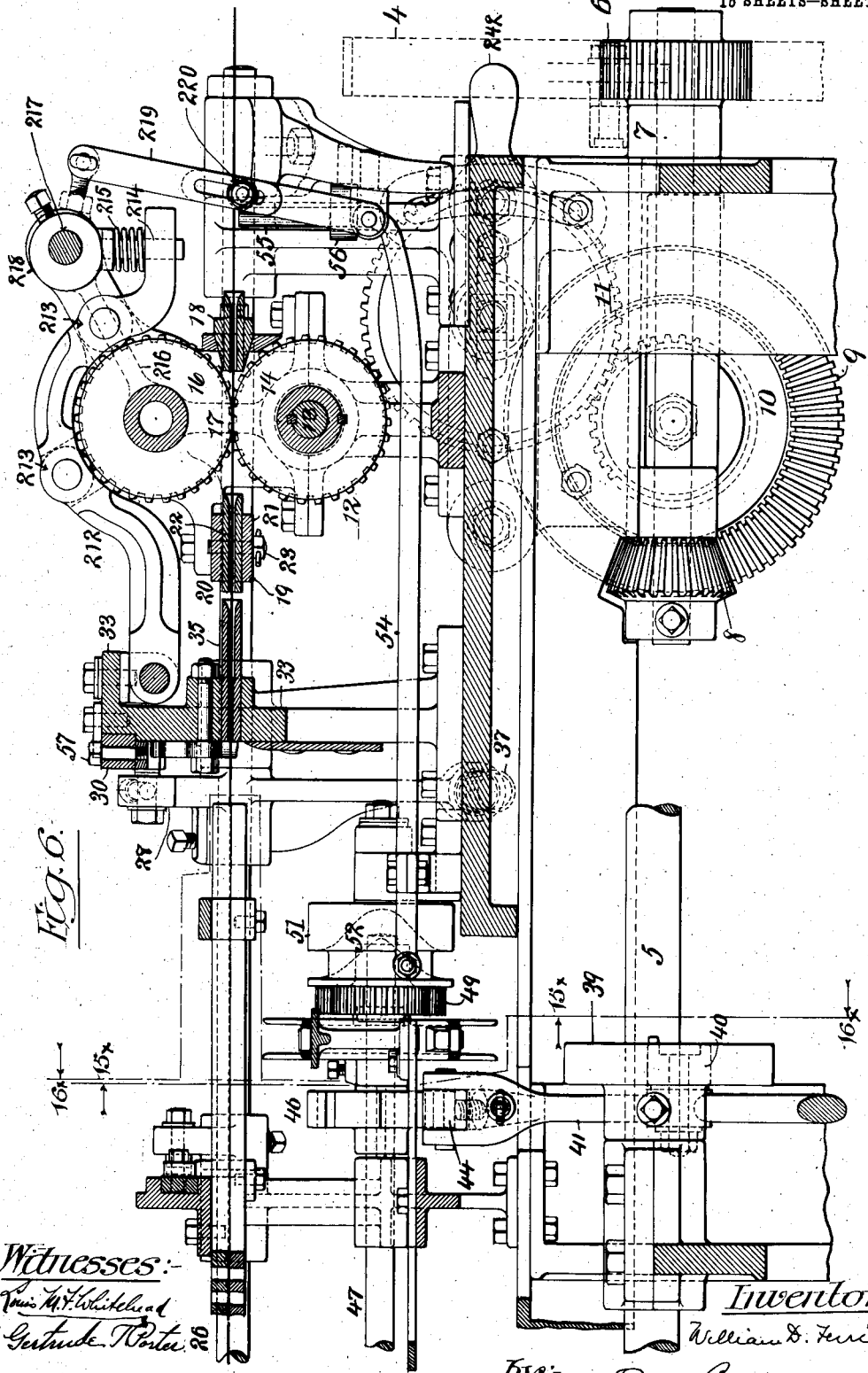

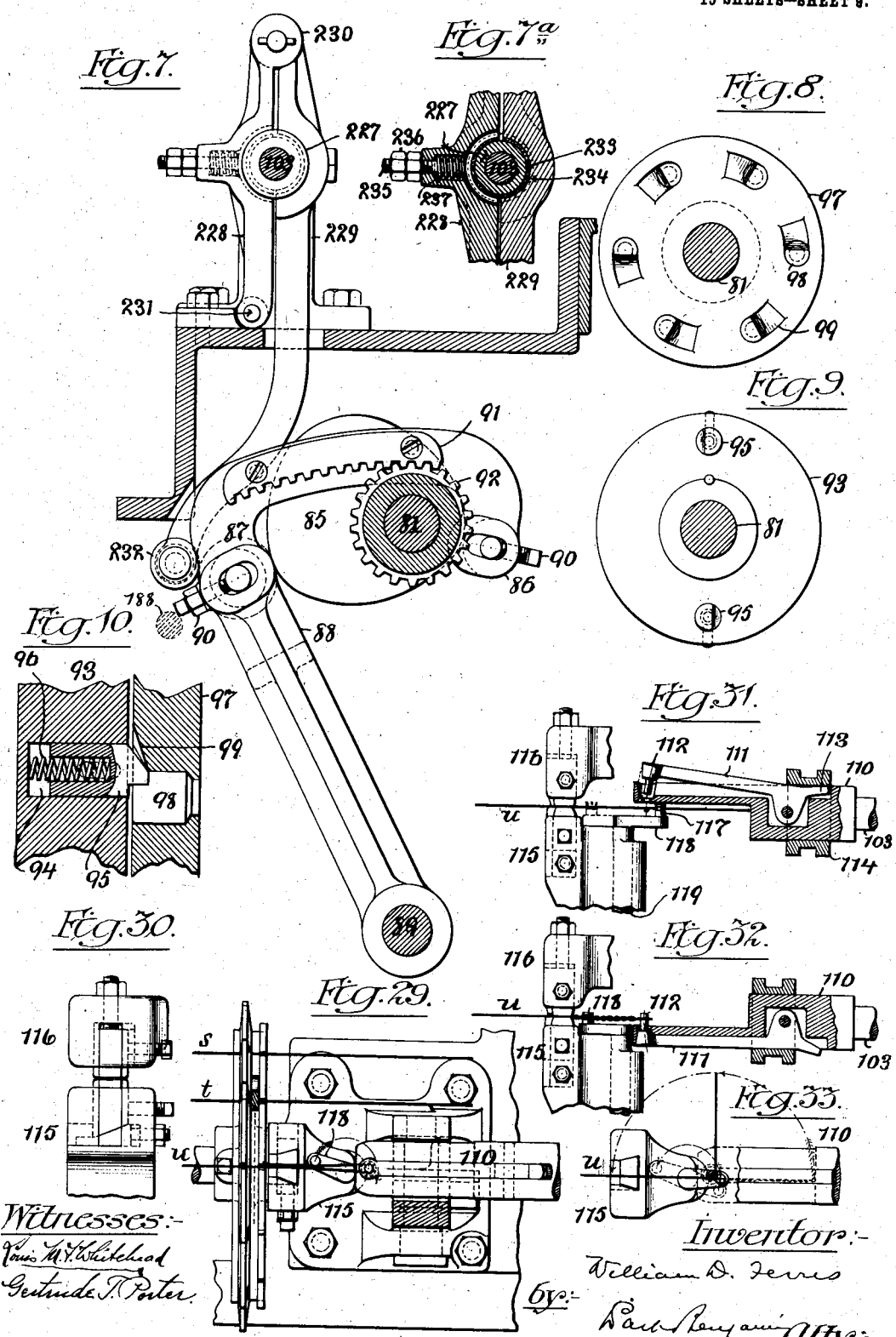

No. 834,050. PATENTED OCT. 23, 1906.
W. D. FERRIS.
BALE TIE MAKING MACHINE.
APPLICATION FILED NOV. 6, 1905.
15 SHEETS—SHEET 10.
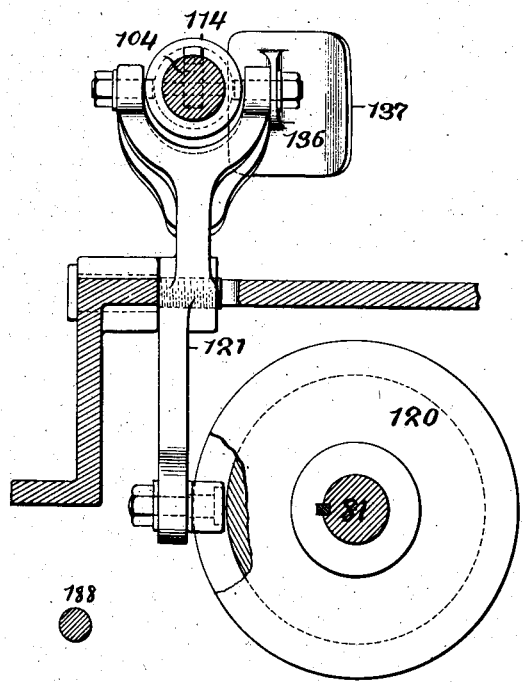
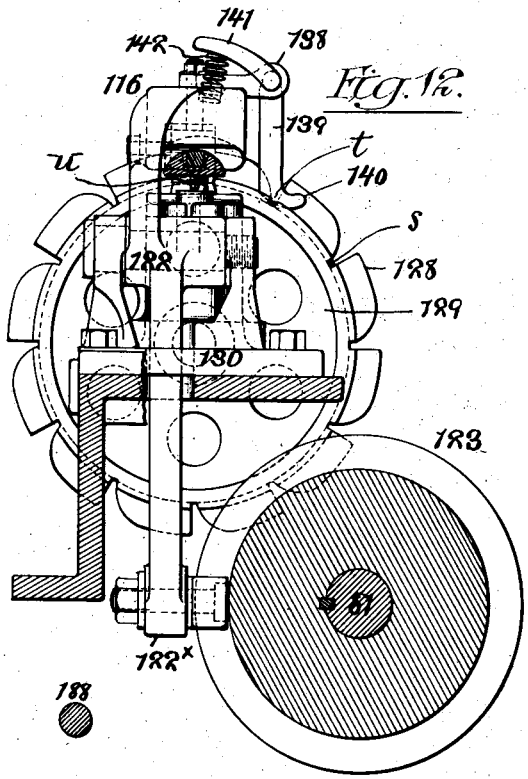
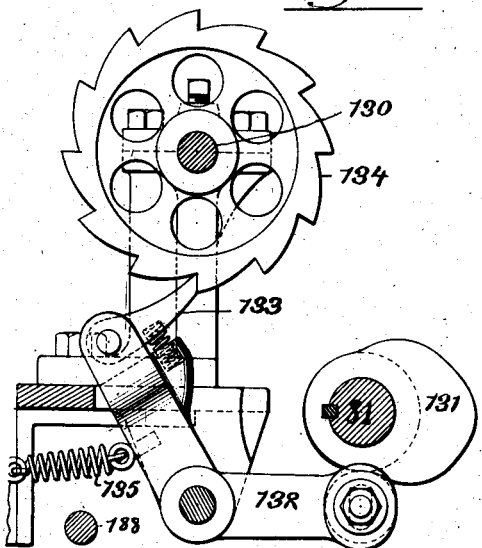
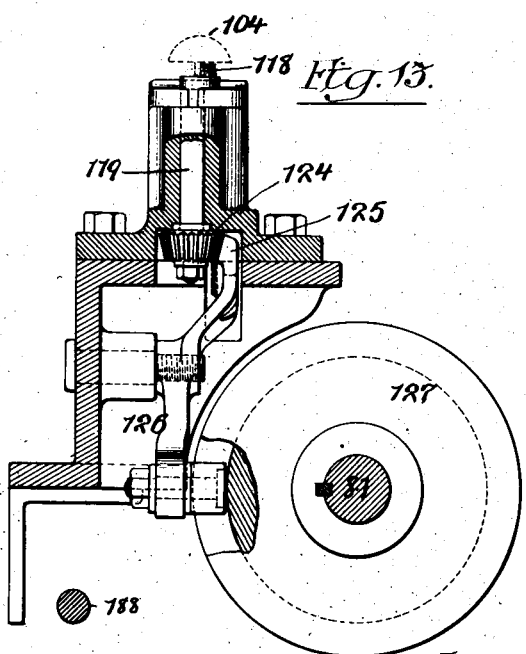

No. 834,050. PATENTED OCT. 23, 1906.
W. D. FERRIS.
BALE TIE MAKING MACHINE.
APPLICATION FILED NOV. 6, 1905.
15 SHEETS—SHEET 11.
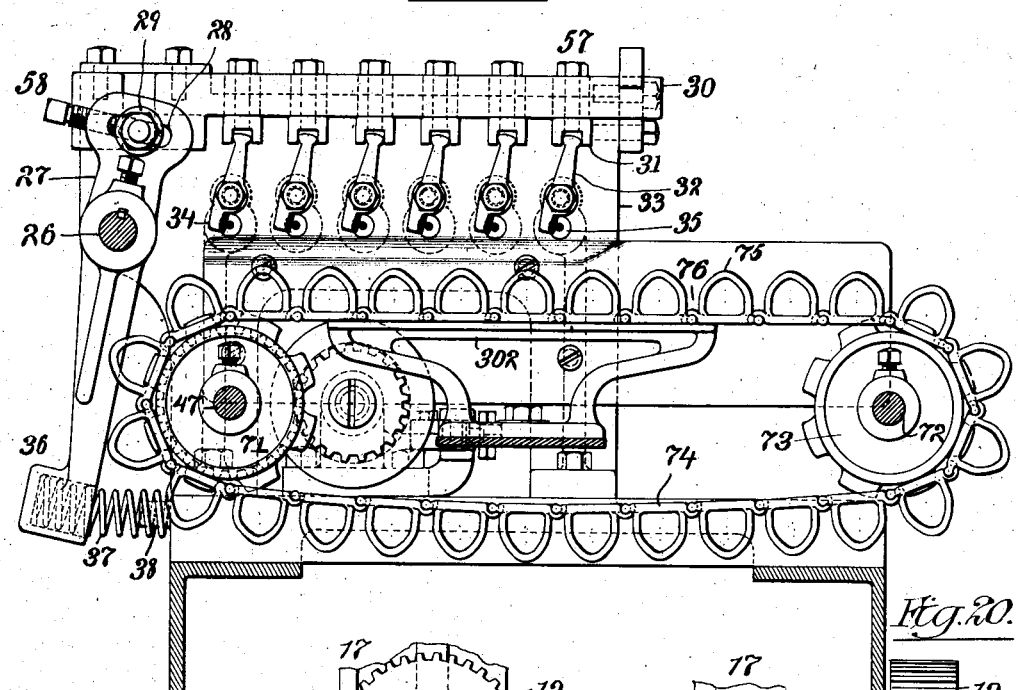
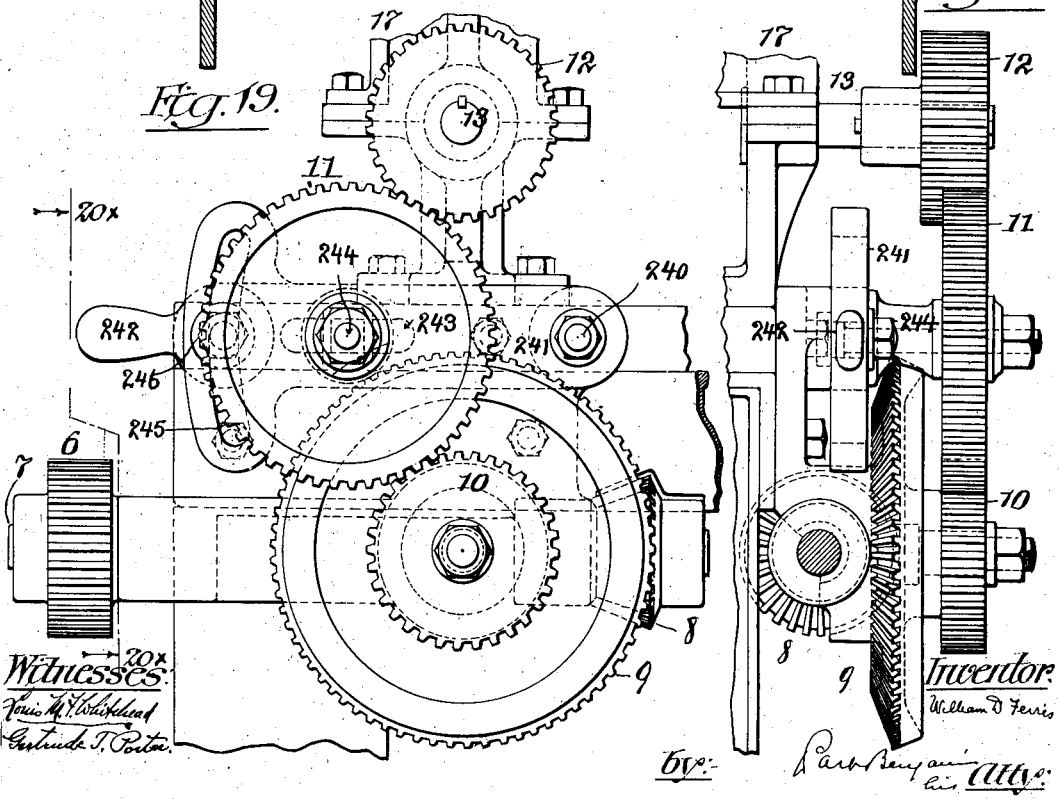

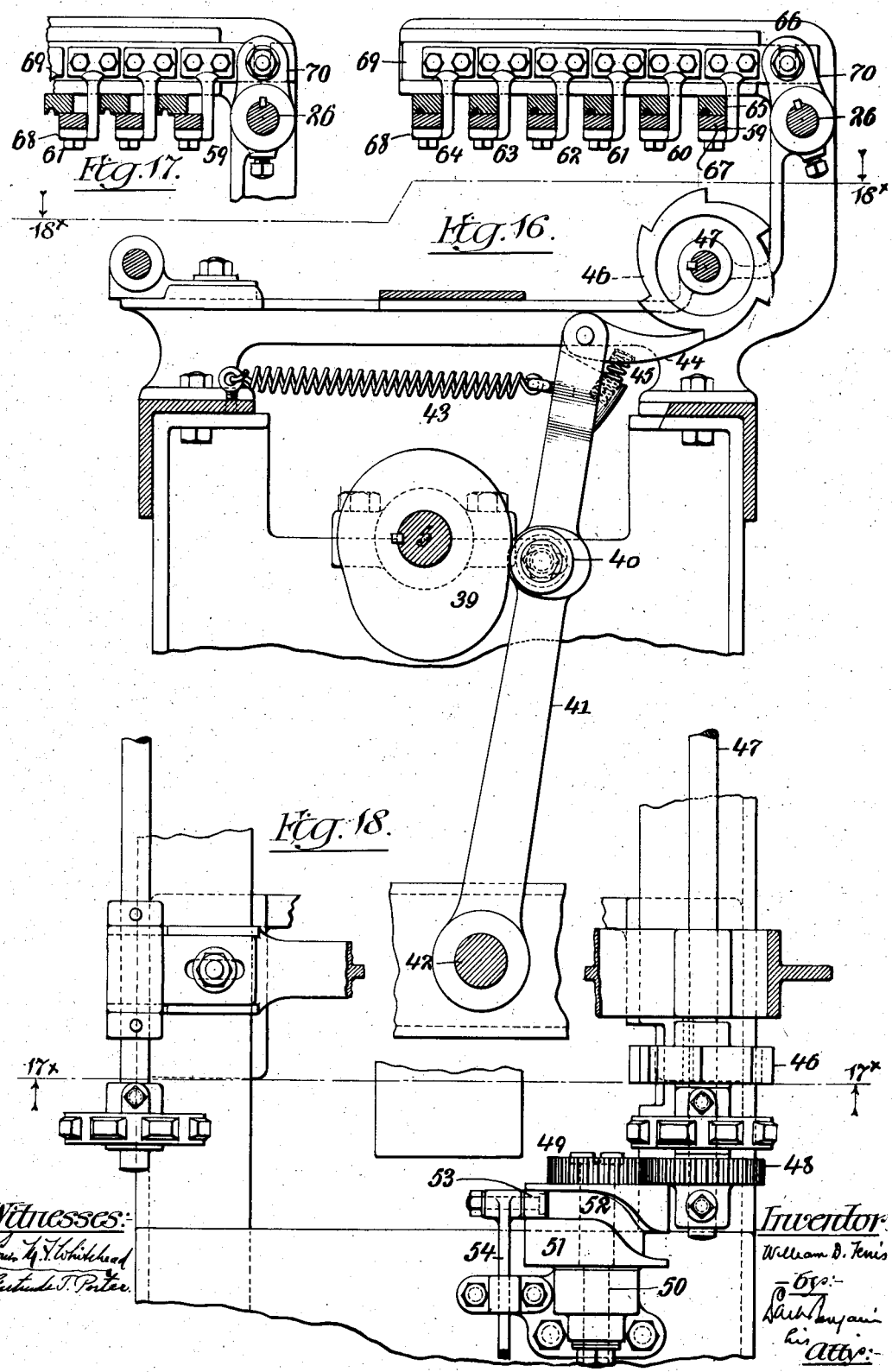

No. 834,050. PATENTED OCT. 23, 1906.
W. D. FERRIS.
BALE TIE MAKING MACHINE.
APPLICATION FILED NOV. 6, 1905.
15 SHEETS—SHEET 13.
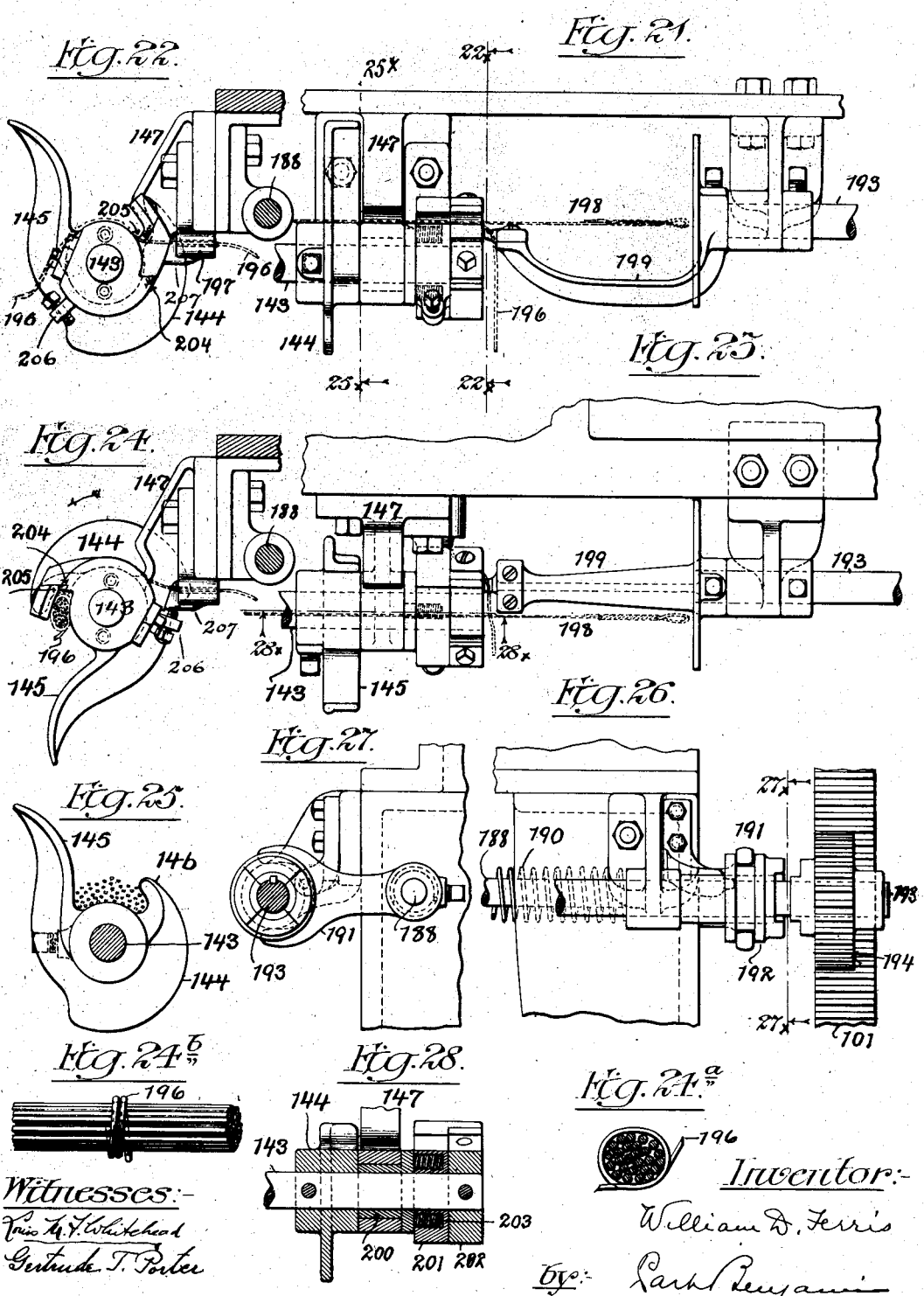

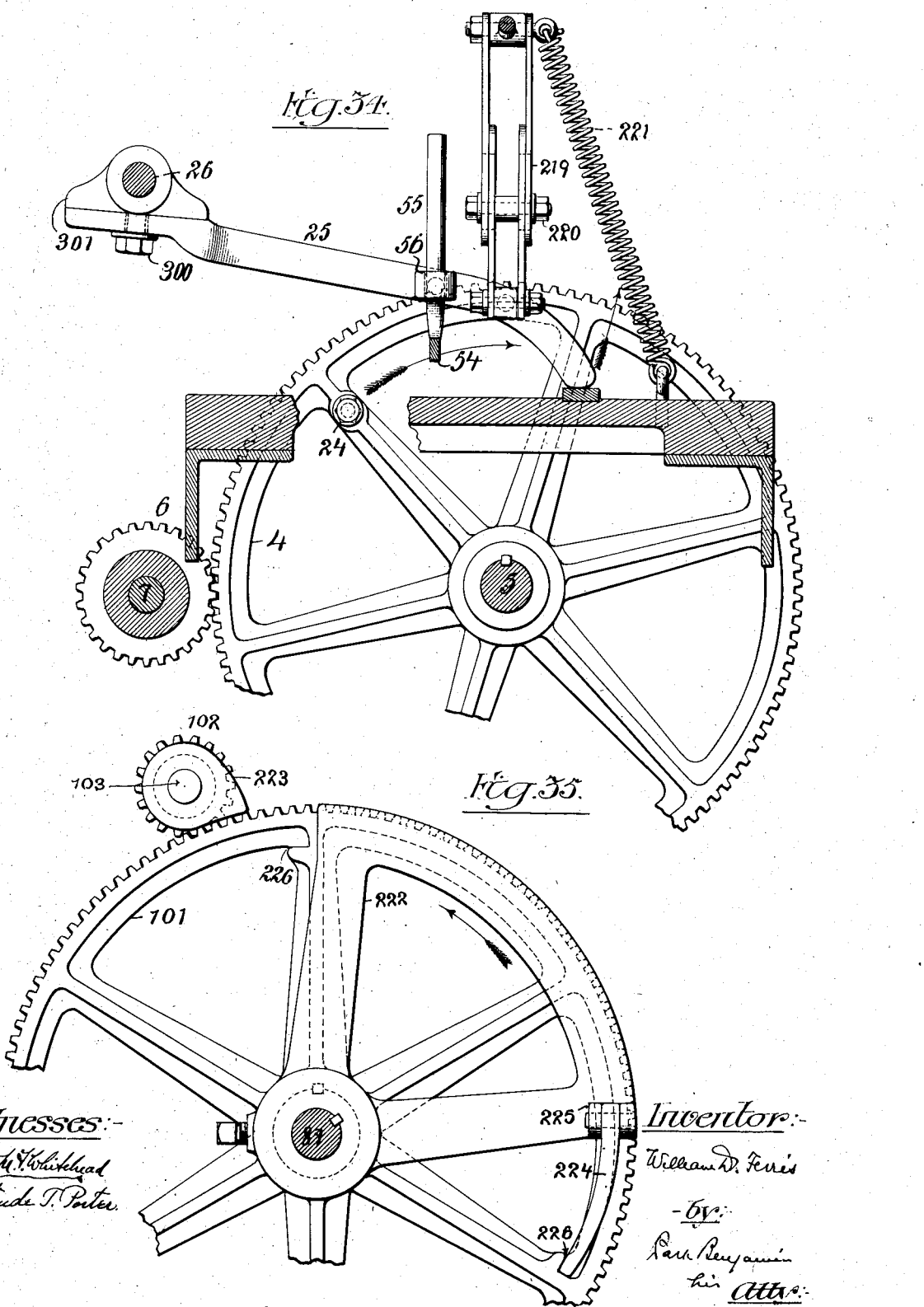

No. 834,050. PATENTED OCT. 23, 1906.
W. D. FERRIS.
BALE TIE MAKING MACHINE.
APPLICATION FILED NOV. 6, 1905.
15 SHEETS—SHEET 15.

WITNESSES:
Gustav Dietrich
Edwin H. Dietrich

INVENTOR
William D. Ferris
BY
ATTORNEY

UNITED STATES PATENT OFFICE.

WILLIAM D. FERRIS, OF STERLING, ILLINOIS.

BALE-TIE-MAKING MACHINE.

No. 834,050.          Specification of Letters Patent.          Patented Oct. 23, 1906.

Application filed November 6, 1905. Serial No. 286,144.

*To all whom it may concern:*

Be it known that I, WILLIAM D. FERRIS, a citizen of the United States, residing at Sterling, Whiteside county, Illinois, have invented a new and useful Improvement in Bale-Tie-Making Machines, of which the following is a specification.

The invention is a machine for making bale-ties from wire-strands; and it consists in improvements in the mechanism of the bale-tie-making machine set forth in United States Patent No. 701,478, granted June 3, 1902, to Peter Frantz. The said improvements are designed to render the machine more rapid, certain, and accurate in operation. They include the construction and arrangement of the loop-forming mechanism, the construction and arrangement of the devices for regulating the length of the bent-over portion of the tie-wire which forms the loop, the construction and arrangement of the tension device for controlling the wire during the regulation aforesaid of its length, the construction and arrangement of the feeding devices for the strands, the construction and arrangement of the knife-adjusting devices in the cutting-off mechanism, the construction and arrangement of the mechanism for conveying the wires laterally and successively from the cutting-off devices, the construction and arrangement of the means for arresting movement of the twisting-head and also of the gearing due to the inertia of said gearing, the construction and arrangement of the continuously-rotating mechanism for actuating the twisting-head, the construction and arrangement of the counting and binding devices, also the various combinations and instrumentalities more particularly set forth in the claims.

In the accompanying drawings, Figures 1 and 1$^a$ show the entire machine in side elevation. Owing to the length of the machine portions of it are broken away. Figs. 2 and 2$^a$ constitute a plan view of the entire machine with portions broken away, as in Figs. 1 and 1$^a$. Fig. 3 is an end elevation and partial section of the machine on the driving-pulley side, taken on the line 3 3 of Fig. 1. Fig. 4 is an elevation of the opposite end of said machine. Fig. 4$^a$ shows in detail the rear side of the cam 170 in section on lines 4$^a$ 4$^a$, Fig. 1$^a$, and taken in the direction of the arrow adjacent to said line. Fig. 5 is an enlarged sectional view taken on the line 5 5 of Fig. 3. Fig. 6 is an enlarged transverse section on the line 6$^\times$ 6$^\times$, Fig. 3. Fig. 7 shows the mechanism for driving the twisting-head in detail and the friction-brake for stopping said head in section on the line 7$^\times$ 7$^\times$ of Fig. 5. Fig. 7$^a$ is a transverse section of the friction-brake shown in Fig. 7. Fig. 8 is a face view of a part of the clutch for driving the twisting-head with its shaft in section, this view being taken on the line 8$^\times$ 8$^\times$ of Fig. 5. Fig. 9 represents the same on the line 9$^\times$ 9$^\times$ of Fig. 5. Fig. 10 shows the connecting locking mechanism of the clutch 93 97 in section on the line 10 10$^\times$ of Fig. 5. Fig. 11 shows in detail the mechanism for raising the looping-pin, taken in section on the line 11$^\times$ 11$^\times$ of Fig. 5. Fig. 12 shows in detail the device for gripping the end of the wire while the loop is being formed in section on the line 12$^\times$ 12$^\times$ of Fig. 5. Fig. 13 shows part of the loop-forming mechanism in detail on the line 13$^\times$ 13$^\times$ of Fig. 5. Fig. 14 shows part of the feeding mechanism in detail on the line 14$^\times$ 14$^\times$ of Fig. 5. Fig. 15 shows in detail the device for cutting the strands to suitable length to form tie-wires and for conveying them to the loop-forming mechanism in section on the line 15$^\times$ 15$^\times$ of Fig. 6. Fig. 16 shows in detail longitudinal guides for the wires and mechanism for driving the endless conveyers which receive the wires from said guides in section on the line 16$^\times$ 16$^\times$ of Fig. 6. Fig. 17 is a detail section on the line 17$^\times$ 17$^\times$ of Fig. 18, showing the longitudinal guides for the wires in open position. Fig. 18 is a detail section on the line 18$^\times$ 18$^\times$ of Fig. 16. Fig. 19 shows in end elevation the gears for driving the feed-rolls. Fig. 20 is a section on the line 20$^\times$ 20$^\times$ of Fig. 19. Fig. 21 is a side elevation in detail of the mechanism for binding the finished ties in bundles. Fig. 22 is a section on the line 22$^\times$ 22$^\times$ of Fig. 21. Fig. 23 is a plan view in detail of the device shown in Fig. 21. Fig. 24 is a detail view of the mechanism for securing the ties in bundles, the same being in position for delivering the bundles from the machine. Fig. 24$^a$ is a cross-section of a bound bundle of completed bale-ties as delivered from the machine. Fig. 24$^b$ is a side elevation of the same. Fig. 25 is a section on the line 25$^\times$ 25$^\times$ of Fig. 21. Fig. 26 is a side elevation of the clutch mechanism for driving the device for binding the wire in bundles. Fig. 27 is a section on the line 27$^\times$ 27$^\times$ of Fig. 26. Fig. 28 is a section on the line 28$^\times$ 28$^\times$ of Fig. 23. Fig. 29 is a detail top view of the mechanism for forming the loop on the end of a tie-wire.

Figure 40:
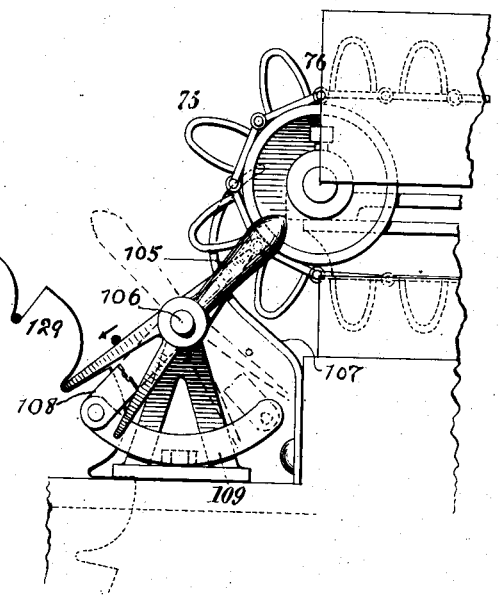
Figure 37:
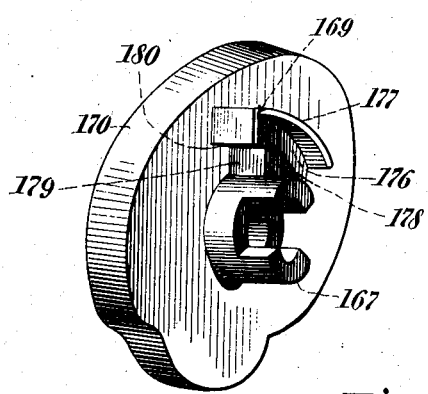
Figure 38:
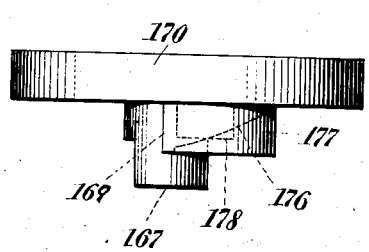
Figure 39:

Fig. 30 is an end elevation of the gripping device for holding the parts of the tie-wire during the process of forming the loop. Fig. 31 is a detail view, in vertical longitudinal section, of the device for forming the loop on the end of the wire. Fig. 32 shows the same with the twisting-head in another position. Fig. 33 is a top view of said loop-forming device, showing the loop in process of formation. Fig. 34 is a side elevation and partial section of the mechanism for operating the device for cutting off the strands. Fig. 35 shows the mechanism for arresting the motion of the twisting-head and for preventing the actuating-gear 101 from running ahead of the segment 222. Fig. 36 shows in detail the mechanism for operating the device for bending the wires. Fig. 37 is a perspective view, and Fig. 38 an edge view, of the cam 170, shown also in Fig. 4ª. Fig. 39 shows the twisted loop or eye formed by this machine and constituting an engaging part of the tie. Fig. 40 shows in detail the device for diverting cut-off tie-wires out of the machine at the will of the operator.

Similar numbers and letters of reference indicate like parts.

The form of tie which this machine is designed to make is that in which the engaging part of the tie consists of a simple twisted loop, Fig. 39. The general operation of the machine is as follows: Any desired number of strands—say, for example, six—are fed into the machine directly from the reels or from the tempering and annealing furnace. These strands are cut to suitable length and then conveyed successively and laterally to the loop-forming mechanism. The now completed ties are delivered to a retaining device in which they accumulate until a sufficient number of them—say twenty-five—have been gathered to form a bundle. A binding-wire is then wrapped around the bundle and the bundle is discharged from the machine. As soon as the ends of the strands are cut off to make one set of ties the strands are moved forward again to allow another set of tie-wires to be cut off, and while the second set of tie-wires is being moved forward the loops on the first set are being formed. During the fraction of a second while the tie-wires are being cut off the grip of the feed-rolls on the incoming strands is relaxed.

*The feeding-in mechanism.*—Motion is communicated from driving-pulley 1 on shaft 2 to pinion 3 on said shaft and from pinion 3 to gear 4 on shaft 5. Gear 4 engages with pinion 6 on shaft 7, Figs. 6 and 19. Shaft 7 carries the bevel-pinion 8, which engages with bevel-gear 9, Figs. 3 and 6. On the shaft of bevel-gear 9 is a gear 10, which engages with gear 11. Gear 11 engages with pinion 12 on the shaft 13, Fig. 3, which shaft carries the lower feed-rolls 14. There are a series of said feed-rolls, each having a portion of its circumference smooth and a portion 15 toothed, the two portions being preferably formed integrally, and the shaft 13, on which said rolls are fast, is journaled in the two upwardly-projecting standards 17. The upper feed-rolls 16 are made in the same way, but their supporting-shaft is not journaled in standards 17, so that they simply lie between said standards and upon the lower rolls, with the toothed portions of each in engagement. They are held down by the pivoted upwardly-curved bar 212, the construction and operation of which will be hereinafter explained. It will thus be seen that when the shaft 13 of the lower rolls is rotated by the means described these rolls communicate their motion through the engaging toothed portions to the upper rolls. As here shown, six wires *m n o p q r* are simultaneously brought into the machine from the annealing furnace or reel. They pass through fixed guides 18, Figs. 3 and 6, then between the smooth surfaces of the feed-rolls, then to fixed guides 19, and then to the cutting mechanism. Each guide 19 consists of a tube 22, clamped by bolt 23 between an upper fixed piece 20 and a lower movable piece 21. The object of this construction is to enable the parts 20 21 to be separated at will and the tube to be removed for cleaning. From the guides 19 the wires pass to the cutting-off mechanism. On one arm of the gear 4 is a roller 24, (best shown in Fig. 34, also in Figs. 2 and 3,) which when said gear rotates meets the depending end of the lever 25. The other end of said lever is pivoted by bolt 300 to the under side of a plate 301, secured on rock-shaft 26, so that said lever may swing laterally on said pivot.

Referring now to Fig. 15, upon rock-shaft 26 is fast an arm 27, having at its upper end a transverse slot 28, which receives a stud 29, which enters the transversely-sliding bar 30. On the under side of bar 30 are secured six blocks 31, recessed on their under side. These blocks 31 receive the upper rounded ends of the knife-levers 32, which are pivoted upon the frame 33. Below their pivots the levers 32 carry cutting-blades 34, which move in close proximity to the face of the guide-tubes 35, Fig. 6, which tubes are secured in frame 33. The lower extremity of the arm 27 on rock-shaft 26 has a cup 36, which receives a helical spring 37, the other end of which spring is received upon a stud 38 on the frame of the machine. By the rotation of the gear 4 the rock-shaft 26 is vibrated, causing the bar 30 to reciprocate in its bearings and so to actuate simultaneously all of the cutting-off levers 31 to divide the six strands. This cutting off of the strands takes place at every sixth revolution of the gear 4, which rotates continuously. This is accomplished by the following means: On shaft 5 of gear 4, Figs. 6 and 16, is a cam 39, which in rotating bears against the roller 40 on the lever 41. Said lever is pivoted at its lower end to a stationary shaft 42, which passes through the frame of the machine. The roller 40 is held in contact with the cam-surface by means of a helical spring 43, which is connected to the lever 41 near its upper end and to a fixed eyebolt. The upper end of lever 41 is forked to receive the pawl 44, which is held in upward position by means of the helical spring 45, seated in a lug in the side of lever 41. Pawl 44 engages with the six-toothed ratchet 46 on shaft 47. Said shaft 47 carries a toothed gear 48, Fig. 18, which engages with a gear 49 on the stud 50, journaled in a bracket on the frame, which stud 50 carries cam 51, having a guide-groove 52 on its circumferential periphery. Entering said guide-groove is a roller 53, which is on the end of the long arm 54, Fig. 6, the end of which arm is bent upward vertically to form a rod 55, (best shown in Fig. 34,) which passes through and is guided by an eyebolt 56, fixed on the lever 25.

It follows from the foregoing construction that at each revolution of the cam 39 the ratchet-wheel 46 is advanced one tooth, and inasmuch as the ratchet-wheel has six teeth it takes six movements of the pawl 44 to effect one revolution of the ratchet, and consequently one revolution of the cam 51. By reason of the shape of the cam-groove 52 the rod 54 is moved longitudinally to the right and left of Fig. 6, and its vertical arm 55, engaging, as already explained, with the bent arm 25, Fig. 34, swings said arm on its pivot 300 intermittently away from the roller 24 on gear 4. The construction is such that the lever 25 is brought into position to be engaged by the roller 24 once during every six revolutions of the gear 4, and during the remaining five revolutions of said gear the arm 25 is either stationary or else is moving into or out of engaging position.

*Adjustments of the cutting-off mechanism.*— Returning to Fig. 15, the following adjustments are to be noted: The recessed blocks 31, which receive the ends of the knife-levers 32, are connected to the sliding bar 30 by bolts 57, which pass through longitudinal slots in said bar. Hence by loosening its associated bolt 57 each block 31 may be adjusted in said bar to alter the throw of its knife-lever and so to allow the knife to be set to compensate for wear. The pivot-pin 29, which connects the lever 27 to the bar 30, may be adjusted in the slot 28 by means of a set-screw 58, and in this way the said bar 30 and all of the blocks carried thereby may be moved to effect a simultaneous adjustment of all the blocks and hence of all knife-levers. The function of the cutting-off mechanism just described is to cut the tie-wires from the ends of the six strands fed into the machine. This of course is done after the strands have been fed by the feed-rolls a sufficient distance past the cutting-off device.

*Releasing the wires from the cutting-off mechanism.*—Extending the entire length of the machine from the cutting-off device to the end are six pair of guides, (shown at 59, 60, 61, 62, 63, and 64, Figs. 2 and 2ª.) Sectional views of these guides are given in Figs. 16 and 17. Each guide, as 59, is made in two parts. The upper fixed part 65 has a groove on its under side to receive the wire and is fast on the arm 66 of the machine. The lower movable part 67 is carried by the depending bracket 68 on the side of the bar 69, which is caused to reciprocate in a groove in arm 66 by means of the lever 70, fast on the rock-shaft 26. As the rock-shaft 26 vibrates the lower part 67 of each guide is moved from under the wire, so that all the wires may then simultaneously drop from the guides. This occurs coincidently with the cutting off of the wires, since both mechanisms are controlled by the same rock-shaft 26.

*The mechanism for laterally conveying the cut-off wires to the loop-forming mechanism.*— On shaft 47, Figs. 2, 2ª, 6, and 15, are a number of sprocket-wheels 71. On the parallel shaft 72, Figs. 2, 2ª, and 15, are a similar number of sprocket-wheels 73. Extending between the bars of sprocket-wheels 71 and 72 are the endless conveyer-belts 74. The said conveyer-belts 74 are formed of link-sections 75, having upwardly-extending projections inwardly curved or inclined on their outer surfaces, so that between said projections are formed recesses 76 for the reception of the wires. Beneath the wire-supporting part of each conveyer is a fixed table 302, Figs. 4 and 15, which holds up the belt and prevents it sagging downward under the weight of the wires. The timing of the mechanism is such that when strands are cut off to suitable length by the knives 34, Fig. 15, the said cut-off portions then, as already described, being released by the guides drop into the recesses, and thus are carried laterally onward by said conveyers. From the conveyers 74 the tie-wires may be carried to the loop-forming mechanism or diverted by means soon to be described out of the machine, in which latter case any further operation upon them may be done by hand or by other devices.

*Devices for operating the loop-forming mechanism.*—The object of this mechanism is to produce a loop or eye by bending over and twisting the end of each tie-wire. It is constructed and operates as follows: Referring first to Fig. 2, on the end of shaft 5, which carries the gear 4, is a sprocket-wheel 77, which through the chain 78 rotates the sprocket-wheel 79, which is fast on one jaw of the clutch 80. The sliding jaw of said clutch is feathered to the shaft 81 and is actuated by the usual yoke and lever 82. The clutch 80 has only one engaging projection 83, so that it is therefore impossible to bring this clutch into operation out of proper time. The part of the clutch 80 which carries the sprocket-wheel 79 is loose on the shaft 81, and hence when the clutch is engaged the shaft 81 is set in rotation by the chain belt 78. The recessed disk 84 on the end of shaft 81 is merely for convenience in turning said shaft by hand by inserting a suitable lever into any one of the recesses of said disk.

Referring to Figs. 5, 7, 7ª, 8, 9, and 10, on shaft 81 is a cam 85, which is received between rollers 86 and 87, journaled in the bent arm 88, which is fast on the rock-shaft 89. The journals of rollers 86 and 87 are adjustable in slots in the arm 88 by means of set-screws 90. On one side of the upper part of arm 88 is bolted a curved rack 91, which engages with the pinion 92 on shaft 81. The pinion 92 is fast on one side of the clutch-disk 93, Figs. 5 and 10. On the outer face of the clutch-disk 93 are two recesses 94, Fig. 10, in each of which is a hollow cylindrical dog 95, which receives internally a helical setting-out spring 96. The protruding end of the dog 95 is tapered to enter the recess in the opposite disk 97 of the clutch. These recesses are formed in the following manner: In the face of the disk 97 is inserted a pair of steel blocks 98, each one of which is cut out on one side to form a shouldered recess, as represented in Fig. 10, which recess meets an inclined recess 99 in the face of the disk 97. It will be obvious that inasmuch as the rack 91 reciprocates the pinion 92 is rotated first in one direction and then in the other and that the engagement of the clutch-disks 93 and 97 will by reason of the construction described occur positively when the disk 93 is turned in one direction and will not occur when it is turned in the other, when the dogs 95 will run upon the inclines 99 and so free themselves from the disk 97. A rocking motion is therefore imparted to the part 97 of the clutch, which is communicated to the sleeve 100, Fig. 5, through which shaft 81 passes. This sleeve carries the gear 101, which engages with the pinion 102, fast on shaft 103, on which shaft the twisting-head 104 is carried. Attention is called to the fact that the shaft 81 extends through the machine, and by mechanism actuated by this shaft and now to be described the various operations of bending and gripping the wire during the loop-forming operation are performed.

*The device for diverting the tie-wires to the loop-forming mechanism or out of the machine* *at will.*—Referring to Fig. 40, the wires are received as they fall from the guides 59 to 64 into the spaces 76 between the projections 75 on conveyers 74, which carry said wires laterally, as already described, and then drop each wire successively upon forked arms 105, several of which are supported upon the rock-shaft 106. The wires are guided to arms 105 by fixed curved bars 107. The rock-shaft 106 is journaled in four fixed inclined standards. Fast on the end of shaft 106 is a lever 108, provided with a handle, by moving which handle said shaft 106 may be rocked in its standards. The lever 108 extends below the shaft 106 and carries a pin which enters one of two holes in the fixed segment 109, by which means the handle may be adjusted to hold the shaft 106 in the position shown in full lines in Fig. 40, when the arms 105 are then in place to permit the wires to slide laterally downward on them, as indicated by the arrow, from the conveyers 74 to the conveyer-wheels 129, by which said wires are carried to the loop-forming mechanism. When the guide-arms 105 are set in the position shown in dotted lines, Fig. 40, the wires slide down into a suitable receptacle on the floor, and hence out of the machine. The object of the adjustable arms 105 is to enable the operator to cause the cut-off wires to pass to the loop-forming mechanism or not at will. Ordinarily the wires come to this machine directly from the annealing-furnace. If the progress of the wires through this furnace is arrested for any cause—as, for example, by the stoppage of the whole machine—that portion of the wires in the furnace will be burned, and so destroyed. It is therefore very important that the movement of the wire into the machine should not be interrupted. If, therefore, it should happen that the loop-forming mechanism needed readjustment or repair, the necessity of stopping the entire machine is avoided by the above-described device, since the wires can be fed in without interruption and cut off and then by adjusting the arms 105 led into the receptacle aforesaid, from which they can be removed and finished by hand, if desired. When the repairs are finished, the handle 108 is thrown over to bring the arms 105 in proper position once more to conduct the wires to the conveyer-wheels 129. The use of the clutch, which is operated by the handle 82, Fig. 2, will now also become apparent. In order to repair the loop-forming mechanism, it is necessary, of course, to stop the motion thereof, and this is done by disconnecting the clutch at 80 by means of the handle 82. Attention is therefore called to the fact that in this machine I provide, first, means for diverting the cut-off wires out of the machine, and, second, means for disconnecting said loop-forming mechanism from the motive power, so as to bring it to rest at will.

*The loop-forming mechanism.*—I now return to shaft 103, Fig. 5, which carries the twisting-head 104. As shown in Fig. 31, the said head consists of a cylindrical carrier 110, in which is pivoted a lever 111, which carries the looping-pin 112. When the end of the lever 111 is depressed, the pin 112 passes through an opening in said carrier. The lever 111 has a projecting end portion 113. Surrounding the carrier is a grooved ring 114, which on being moved in one direction acts upon said carrier to force the pin through the hole therein, as shown in Fig. 5, and when moved in the other direction acts upon the arm 113 of said lever to lift the pin 112 out of said hole, as shown in Fig. 31. Besides the twisting-head and pin just described I employ, in order to form the loop on the end of the wire, two other devices—viz., the vise for gripping said wire and a swinging pin for bending said wire back on itself preparatory to twisting the loop. The vise, which is shown in Figs. 31 and 32, consists of a fixed lower portion 115 and a vertically-movable upper portion 116, which upper portion is brought down upon the lower portion in order to grasp the wire. The bending-pin 117, Fig. 31, is carried by a crank-arm 118 on the end of a vertical spindle 119, which passes through the same casting which carries the lower part 115 of the vise. The three parts—namely, twisting-head, vise, and bending-pin—are all operated by cams fast on the shaft 81. The twisting-head is operated from cam 120, Fig. 5, in the peripheral groove of which runs a roller on the end of the pivoted lever 121, the other end of which lever is yoked to connect with the grooved ring 114. The upper jaw 116 of the holding device is pivoted at 122 and has a downwardly-extending arm 122$^\times$, carrying a roller entering a circumferential groove of cam 123. On the lower end of the spindle 119, which carries the bending-pin 118, is a bevel-gear 124, with which engages a curved rack 125, Fig. 13, carried on the end of a pivoted lever 126, which lever has at its lower end a roller entering the groove in the circumference of the cam 127. The loop-forming operation is performed in the following manner: The wire on which the loop is to be formed passes from the arms 105 when set as shown in Fig. 40 to the recesses between projections 128 on the circumference of conveyer-wheels 129. Said wheels are carried on a long shaft 130, Figs. 5 and 14, which is rotated in the following manner: On the shaft 81 is a cam 131, which acts upon a bell-crank lever 132, which carries at its end a spring-pawl 133. Said pawl engages with a ratchet 134, fast on shaft 130. Lever 132 is provided with a helical retracting-spring 135.

*Device for equalizing the ends of the wires bent to form loops.*—Attention is now called to Fig. 11 and to the arrows shown adjacent to the line 11$^\times$ 11$^\times$ of Fig. 5, showing the direction in which this section is taken. It will be obvious that as the wires pass into the indentations of the wheels 129 their extremities which are about to be looped and twisted may protrude beyond said wheel to different extents. It is necessary, therefore, to equalize these ends before the twisting operation is begun, and hence to provide a device which will act upon each wire in turn just before it reaches the twisting device to push it in a longitudinal direction so that it will protrude from the conveyer-wheels nearest the loop-forming device only to a certain definite amount. This is effected in the following manner: Secured on one arm of the yoke of lever 121, Fig. 11, by means of a bolt and lug 136 is a vertical plate 137. This plate strikes the end of the wire $t$, Figs. 5 and 12, next preceding the wire $u$, which wire $u$ is actually in the twisting device and forces that wire $t$ inwardly, (to the left of Fig. 5,) and thus regulates the extent of its protrusion. Meanwhile the wire $t$ is subjected to the action of a tension device, which is illustrated in Fig. 12. On the top of the upper jaw 116 of the vise is a bar 138, which receives the transverse pivot of a rod 139, carrying a presser-foot 140 at its lower end. The rod 139 has a bell-crank arm 141, which bears upon the helical spring 142. After the jaw has descended for a certain distance and just before the pusher-plate 137 is ready to act the presser-foot 140 comes down upon the wire $t$ and prevents its being thrown too far backward by the endwise push of said plate.

*The formation of the loop.*—The formation of the loop or engaging part of the tie on the end of the wire is now effected in the following manner: The first position of the wire is as shown in Fig. 31. The upper jaw 116 of the vise has descended sufficiently far to prevent the end of the wire which is to be bent backward from looping over the standing part. The pin 112 on lever 111 now moves down, as indicated by the small arrow, Fig. 31. The bending-pin 118 then swings around, as shown in Fig. 33, carrying that portion of the wire which is beyond the pin 112 around said pin and backward, thus producing a complete loop in the wire, as shown in Fig. 29. The jaw 116 now completes its descent, tightly gripping both parts of the wire, as shown in Fig. 30. The twisting-head then rotates and twists together the parts forming the loop, as shown in Fig. 32. The twisting-head then resumes the position shown in Fig. 31, and the pin 112 rises, freeing the loop. The upper jaw 116 of the vise rises, and the bale-tie with the complete loop on its end is now ready to go to the bundling device.

The foregoing operation is repeated successively on all the wires as they are carried to the loop-forming mechanism by the conveyer-wheels 129.

*The counting and bundling devices.*—Journaled in bearings on the front of the machine is a rock-shaft 143, Figs. 1, 1$^a$, 2, and 2$^a$, fast on which are a number of segments 144, each provided with two horns 145 and 146, which normally project upwardly, as shown in Figs. 3, 22, and 25. The completed ties which remain in the recesses of wheels 129 are carried forward from the loop-forming mechanism by the rotation of said wheels in the direction of the arrow adjacent thereto (shown in Fig. 4) and successively drop from said wheels upon the inclined guides 147, of which there are a number fixed upon the front of the machine. As the wires successively slide down these guides 147 they accumulate between the horns 145 and 146. The number of wires which is permitted to accumulate in said space is controlled by the counting device now to be described.

Referring to Figs. 4, 4ª, 36, 37, and 38, 148 is a toothed wheel journaled in a depending fixed arm 149, Fig. 4, secured at the top of the machine. This wheel is given as many teeth—say, for example, twenty-five—as there are to be wires in a completed bundle, and it is placed in such position with respect to a wire-carrying wheel 129 that during the rotation of said wheel 129 each wire therein successively strikes a tooth of wheel 148, so that when twenty-five wires have thus acted upon it said wheel 148 completes one revolution. On one side of wheel 148 is a lug 150, Fig. 2ª, which has an inclined face, which face at each revolution of the wheel 148 strikes the inclined end of a horizontal lever 151, pivoted at 152 in a lug projecting from the arm 149, in which the tooth-wheel is journaled. Beyond the pivot 152 the lever is continued rearwardly and finally bent, as shown at 153, so that its extremity may strike against the fixed part of the frame of the machine, and thus prevent said lever 151 from being swung so near to the toothed wheel 148 as to become engaged in the spokes thereof. A helical spring 154, connected to lever 151 and the frame of the machine, serves to keep the inclined end of said lever in proper position to be acted upon by the pin 150 on wheel 148. By reason of this construction the lever 151 is vibrated on its pivot at every revolution of the wheel 148. Connected to the lever 151 and between the pivot 152 and its free end is a rod 155, Figs. 1ª and 2ª, which connects with the crank-arm 156, which is on the upper end of the vertical rock-shaft 157, Figs. 1ª and 36. The said shaft passes through two fixed collars 158, Fig. 4, (one shown in Fig. 36,) on a vertical casting 159, carried by the arm 160, bolted to the frame of the machine. On the opposite side of said casting is pivoted at 161 a swinging arm 162, Fig. 36, terminating below in a yoke 163, which engages in the usual way with the sliding jaw of a clutch 165 on the shaft 81. On the shaft 81 is a fixed collar 166, having projections entering recesses on the rear side of the sliding part of said clutch. Between said sliding part and fixed collar 166 are interposed springs 164, which normally tend to throw said sliding part toward the fixed part 167 of the clutch, which fixed part is formed on the hub of a cam 170, which cam is loose on shaft 81.

The object of the mechanism now to be described is to keep the sliding part of the clutch 165 out of engagement with the fixed part 167 except during a certain period when it is desired that the cam 170 shall be set in rotation. This is effected in the following manner: Supported by an arm 171 on the side of swinging arm 162 is a pivoted latch 172, having a shouldered recess at its lower end, which by the action of spring 173 is held in engagement with the end of a dog 174, pivoted on the side of arm 162. Said dog is normally pushed downward by the helical spring 175, acting on its upper side. The cam 170 is shown separately in perspective in Fig. 37, in face view in Fig. 4ª, and in edge view in Fig. 38. It has two acting surfaces—namely, the lateral inclined surface 176 of projection 177 and the upper inclined surface 178 of projection 179. Between the extremities of these projections there is a space 180. The effect of surface 176 of projection 177 as the cam rotates is to force the dog 174 rearwardly, the arm 162 then swinging on its pivot to the right of Fig. 36. The effect of the surface 178 of projection 179 is to raise the engaging end of said dog. The two surfaces 176 178 therefore act conjointly upon said dog to push it rearwardly and also to raise its engaging end, with the result of ultimately bringing its other extremity into position to be engaged by the latch 172. The arm 161 being carried rearwardly by the above movement of the dog moves the sliding part of the clutch 165 out of engagement with the cam 170. The cam therefore comes to rest, since the flange 169 of projection 177 strikes the dog, and thus stops the cam in proper position. The clutch 165 is thrown into operation, and rotation is communicated from shaft 81 to cam 170 by means of a toe 181, Fig. 36, on the lower end of the vertical rock-shaft 157, which when said rock-shaft is suitably turned in the manner already described strikes the latch 172, and so frees the dog 174. The end of the dog hitherto engaged with the cam then drops downward in the space 180. The springs bearing on the sliding part of the clutch 165 throw that part into engagement with the cam 170. On one face of the cam 170 is a groove 182, Fig. 4, in which runs a roller 183 on the sliding bar 184, supported in inclined ways on the frame of the machine. On the upper edge of bar 184 is a rack 185, which engages with a pinion 186 on shaft 143. The reciprocation of rack 185 therefore rocks shaft 143. The effect of rocking the shaft 143 in one direction is to compress the ties (which have slid down the guides 147 into the spaces between the horns 145 and 146 of the segment 144) into a compact bundle. This occurs when the segment swings to the right of Fig. 22, when the wires are compressed between the horn 145 and the guides 147. The effect of swinging the segment 144 in the opposite direction, as shown in Fig. 24, is to deliver the now bound bundle in the manner hereinafter described.

*Mechanism for binding the bundles of wire.—* On the upper side of the slicing bar 184 is a fixed cam 187, Figs. 1, 2, 2ª, and 4, which when said bar travels outwardly strikes the end of the sliding rod 188 and moves it in the direction of the arrow, Fig. 2ª, against the action of the helical spring 189. The rod 188 extends longitudinally to the other end of the machine, where another spring 190, Figs. 2 and 26, is arranged to act in the same way as spring 189. Fast upon the rod 188 is a yoke 191, Figs. 26 and 27, which engages with the sliding jaw of a clutch 192, which is feathered on the shaft 193, Fig. 2. (See also Figs. 21, 23, 26, and 27.) Loose on shaft 193 is a pinion 194, which carries the other jaw 192, and engaging with the pinion 194 is gear 101 on shaft 81, Figs. 1, 2, 3, 26, and 35.

It will be obvious from the foregoing that when the rod 188 is moved longitudinally to close the clutch 192 then rotary motion is transmitted from gear 101 to pinion 195, and so to shaft 193.

Referring now to Figs. 21, 22, 23, and 24, the binding-wire 196 for the bundle of ties, Fig. 22, extends through a fixed guide 197 and over the segment 144, so that it lies underneath the incoming ties, one of which is shown at 198, Fig. 21. On the shaft 193 is a wrapping-arm 199, which engages with the binding-wire 196 and when the shaft 193 is rotated in the manner already described carries said wire 196 twice around the bundle of ties, as shown in Figs. 24ª and 24ᵇ. It is next necessary to cut off the binding-wire from the main portion, and this is effected in the following manner: On shaft 143 and adjacent to the horned segment 144 is first a bushing 200, Fig. 28, then a loose disk 201, and then a fixed disk 202. The loose disk 201 has recesses in one face containing spiral springs 203, which acting against the bushing 200 hold said disk 201 in frictional contact with the disk 202. On the circumferential periphery of disk 202 is a knife 204, Fig. 22, and on the circumferential periphery of disk 201 is another knife 205. The relation of these two knives is shown in Fig. 22, from which it will be seen that when the parts are in the position there represented the knife 204 lies below the knife 205, with the wire 196 lying between them. This is the position of the wire after its end has been coiled around the bundle of ties in the manner already described. The shaft 143 now rotates in the direction of the arrow shown in Fig. 24, carrying the disk 202 with it, but turning freely in the disk 201 until the knife 204 strikes the wire 196, so that the wire becomes pinched between the two knives. By reason of this pinching of the wire and the conjoint rotation now of both disks new wire to form the next wrapping is drawn into place, and this continues until an adjustable stop-pin 206, which is on the periphery of the disk 201, strikes a fixed projection 207, which is integral with the wire-guide 197. This brings the parts into the position shown in Fig. 24. The disk 201 is now held stationary; but as the disk 202 continues to rotate the knife 204 on that disk acts conjointly with the knife 205 on the disk 201 to cut the wire. The now wrapped bundle of wires falls by its own weight down the inclined upper surface of the horns 145 and is received between two horns 208 and 209, which are cast together and are supported upon a stationary shaft 210, which is supported in the hangers 211 below the machine. The horns 208 and 209 form pockets which are simply receptacles for the completed bundles and from which said bundles are removed by hand.

*The mechanism for adjusting the pressure of the feed-rolls and for intermittently relaxing the same.—*Pivoted in lugs depending from a flange on the top of frame 33, Fig. 6, is a series of bars 212, each carrying two rollers 213. These rollers rest upon the upper feed-rolls 16. In the ends of the bars 212 are headed pins 214, which are free to slide vertically in said bars, but which are held upward by helical springs 215 between the pin-heads and the bars. Extending angularly upward from each standard 17 are arms 216, in which arms is journaled the rock-shaft 217, carrying eccentrics 218, which bear upon the heads of the pins 214. Fast on said shaft is an arm connected by a link 219 to the arm 25, Fig. 34. The link 219 is made in two parts, which are slotted, and through which slots passes the bolt 220. In this way the link 219 can be adjusted to length. When the link 219 is drawn downwardly by the arm 25, the eccentrics 218 force the pins 214 down against the action of springs 215, and thus apply an elastic pressure to the feed-rolls 16. When the link 219 rises, the eccentrics are turned, so as to release this pressure. The downward action of the link is assisted by the helical spring 221, Fig. 34, which is connected to an eyebolt on the frame of the machine. The normal pressure of the upper feed-rolls upon the lower rolls can be adjusted by setting the pin 214 so as to regulate the tension of its spring 215. The function of the eccentrics and linking mechanism is to relax the pressure of the upper feed-rolls upon the lower rolls at the time when the cutting-off mechanism for the wires comes into operation. If such means for diminishing the pressure of the rolls was not provided and the incoming wire continued to be gripped between said rolls, the effect of the cutting-knives would be to buckle the wires over the interval between said knives and feed-rolls, which would be apt to kink the wires and prevent them coming through the guide-tubes 35.

*Mechanism for stopping the twisting-head in proper position.*—After completing the twisting of the loop at the end of the tie, it is necessary to stop the twisting-head in exactly proper position. This is effected by the following mechanism: On the end of the continuously-rotating shaft 81, Figs. 5 and 35, is secured a segment 222, and on the end of the shaft 103, which carries the twisting-head, is a toe-cam 223. When the segment 222 runs under the cam 223, the shaft 103 is prevented from rotating. By reason of the contact of the cam with the circumferential periphery of the segment the shaft 103, and consequently the twisting-head, is therefore stopped as soon as the segment 222 runs under the cam 223 and is held from further rotation until the segment in rotating runs clear of the cam. Inasmuch as the large gear 101 is free on the shaft 81, it is liable to run ahead of said shaft, with the possible result of dropping the point of the cam 223 in front of the advancing edge of the segment 222, when injury would follow. In order to prevent this, a latch 224 is pivoted in lugs 225 on the face of the segment 222 and engages in any one of three notches 226, which are made near the ends of three of the spokes of gear 101. In Fig. 35 two of these notches are shown. The reason for using three notches is that the gear 101 operates during one-third of its revolution. As the latch when in engagement with the notch directly connects the gear 101 and the segment 222, it is obvious that all possibility of the gear running ahead of the segment is thus prevented.

*Device for checking rotation of the twisting-head.*—When the segment 222 runs under the cam 223, and thus prevents the shaft 103 from rotating, it is obvious that there may be an abrupt stoppage of motion of the twisting-head, which would be detrimental to the machinery if some means were not provided to prevent this. Such means is illustrated on Figs. 5, 7, and 7ª. Fast on the shaft 103 is a collar 227, which is received between brake-jaws 228 and 229, which are pivoted together at 230. One of said jaws is pivoted at its lower end 231 to the frame. The other of said jaws extends down through an opening in the frame and carries at its end a roller 232, which bears against the outer edge of the vibrating twisting-head-driving arm 88. When said arm is thrown outwardly by the cam 85, as shown in Fig. 7, it acts upon the roller 232 to bring the brake-jaws 228 and 229 together, and so apply brake-pressure to the collar 227. This brake-pressure gradually reduces the speed of rotation of the shaft 103, and hence of its twisting-head. As pinion 102, which engages with wheel 101, is fast on shaft 103, it follows also that by this means motion of gear 101 is checked. In the brake-jaw 229 is a lining of leather 233, backed by a lining of steel 234, both being fixed in position. In the jaw 228 the steel backing and leather lining are connected together and are separate from the jaw in which they are seated, and to the steel lining is fast the pin 235, which extends through the wall of the jaw and is provided with adjusting-nuts 236 and with an internal spring 237. By means of this device the normal brake-tension can be regulated.

*Means for varying the lengths of the tie-wires,* (Figs. 19 and 20.)—In order to vary the length of the ties, I preferably insert gears 10 and 12 of different diameters. It then becomes necessary to arrange the intermediate gear 11 so as to engage with said gears notwithstanding such changes. This I accomplish in the following manner: On the frame of the machine is pivoted at 240 an arm 241, having a handle 242. In said arm is a longitudinal slot 243, in which the stud 244, which carries the gear 11, is adjustable. Also near the end of said arm is a transverse curved slot 245, through which passes a clamping-bolt 246. The gear 11 may thus be adjusted longitudinally on arm 241, and the arm may be adjusted on the pivot 240, these adjustments being relatively regulated to bring about the desired engagement of gear 11 with gears 10 and 12.

*The operation and timing of the machine.*—This is as folllows: The strands are preferably fed into the machine directly from the annealing-furnace and are drawn in continuously by the action of the feed-rolls until a sufficient length of each strand has passed the cutting-off device. The cutting-off knives then divide all of the wires simultaneously, and at the same instant the pressure of the upper feed-rolls upon the lower rolls upon the wire is relaxed, so as to prevent any possible bending or kinking of the wire during the cutting-off operation. The cut-off lengths then fall by gravity into the recesses in the endless conveyers, this being permitted by the opening of the guides which have received the several strands. The conveyers now carry the wires laterally and discharge them upon the adjustable inclined arms, down which they slide one after the other, and so enter the successive recesses of the conveyer-wheels. The rotation of these wheels operates to bring each wire in turn to the loop forming or twisting device; but before each successive wire reaches the twisting device the amount of protrusion of its end from the carrying-wheel nearest to said twisting device is regulated, and at the same time the tension device comes into the operation frictionally to hold that wire and prevent it from being longitudinally moved too far. The wire, which is now ready to have the loop formed upon it, is by the further rotation of the carrying-wheels transported into the gripping-vise, which closes sufficiently to prevent the free end of the wire when it is turned over to make the loop from riding above the standing part. The twisting-pin comes down and the free end of the wire is bent around it laterally to form the loop, this free end then entering between the jaws of the device, which then finally close, gripping both parts of the wire. The twisting-head then rotates to produce the loop, and as soon as the loop is completed the motion of the shaft carrying the twisting-head is arrested, so as to leave the twisting-pin in proper position. At the same time the brake mechanism on the shaft carrying the said head comes into action. The twisting-head being now raised and the gripping-vise open, the completed tie is carried onward in the conveyer-wheels and moves the counting-wheel ahead one tooth. It then passes down the inclined guides and is received between the horns of the bundling device. As soon as a number of ties have accumulated in the bundling device in the manner above described—say, for example, twenty-five, which number corresponds to the number of teeth in the counting-wheel—that wheel completes one revolution and through the intervening mechanism sets in operation the rock-shaft of the bundling device to compress the wires into a close bundle. As soon as this is done the shaft carrying the wrapping-finger is rotated and the wrapping-finger carries the binding-wire around the now compressed bundle of ties. As soon as this is accomplished the cutting-off device comes into operation to draw new binding-wire into position and to cut off the already-wrapped binding-wire. Immediately afterward the bundles slide down the inclined surfaces of the compressing-horns into the final receptacle.

It will of course be understood that all of the various mechanisms are to be timed to produce the aforesaid result.

I claim—

1. A vise, means for actuating said vise to bring its grasping parts into contact with a wire disposed between them, means for bending over an end of said wire to form a bight and for carrying said turned-over end between said grasping parts, means for further closing said vise to cause it tightly to grasp both parts of said wire, and means for rotating said bight to form a closed loop.

2. A fixed vise-jaw, a vertically-moving coöperating jaw, means for moving said last-named jaw into contact with a wire disposed between said jaws, means for bending over said wire in a horizontal plane and carrying the bent-over end between said jaws, means for moving said movable jaw tightly to grasp both parts of said wire, and means for rotating said bent-over wire to form a closed loop.

3. A vise for receiving the standing part of a wire, a pin, means for moving said pin into position alongside of the wire protruding beyond said vise, means for bending said wire around said pin to form a bight, and for carrying the bent-over portion thereof into said vise beside said standing part, means for actuating said vise to grasp both parts of said wire, and means for rotating said pin to form said bight into a closed loop.

4. A vise constructed to hold a wire, a pin, means for moving said pin into position alongside of the wire protruding beyond said vise, a second pin, means for carrying said second pin around said first pin and thereby bending said wire around said first pin and carrying the bent-over part into said vise, means for actuating said vise to clamp both parts of said wire, and means for rotating said first pin to form said bight into a closed loop.

5. A vise constructed to hold a wire, a pin, means for moving said pin into position alongside of the wire protruding beyond said vise, a second pin, means for carrying said second pin around said first pin and thereby bending said wire around said first pin and carrying the bent over part into said vise, means for actuating said vise to clamp both parts of said wire, means for rotating said first pin to form said bight into a closed loop, and means for withdrawing said first pin from said loop.

6. A vise constructed to hold a wire, a pin, means for moving said pin into position alongside of the wire protruding beyond said vise, a second pin, an arm carrying said pin, a rock-shaft carrying said arm, means for rotating said shaft to move said second pin around said first pin, and to carry said bent-over part into said vise, means for actuating said vise to clamp both parts of said wire, and means for rotating said first pin to form said bight into a closed loop.

7. A vise constructed to hold a wire, a rotary head in line with said wire, a pin disposed in said head and movable transversely of the same, means for moving said pin into position alongside of the wire protruding beyond said vise, a second pin, means for moving said second pin around said first pin and thereby bending said wire around said first pin and carrying the bent-over part into said vise, means for actuating said vise to clamp both parts of said wire, and means for rotating said head to form the bight of said wire into a closed loop.

8. A vise constructed to hold a wire, a rotary head in line with said wire, a lever transversely pivoted in said head, a pin carried by said lever, means for vibrating said lever to move said pin into and out of position alongside of the wire protruding beyond said vise, a second pin, means for moving said second pin around said first pin and carrying the bent-over part into said vise, means for actuating said vise to clamp both parts of said wire, and means for rotating said head to form the bight of said wire into a closed loop.

9. A vise constructed to hold a wire, a rotary head in line with said wire and having a longitudinal extension, a lever transversely pivoted in said head, a pin carried by said lever and constructed to pass through an opening in said extension, means for vibrating said lever to move said lever through said opening and into and out of position alongside of the wire protruding beyond said vise, a second pin, means for moving said second pin around said first pin and bending said wire around said first pin and carrying said bent-over part into said vise, means for actuating said vise to clamp both parts of said wire, and means for rotating said head to form the bight of said wire into a closed loop.

10. The combination in a wire-loop-forming mechanism with a vise constructed to hold the wire, of means for actuating the vise to bring the grasping parts thereof into contact with said wire, means for forming a bight in the wire protruding beyond said vise and for simultaneously carrying the bent-over part of said wire into said vise, and means for further actuating said vise to grasp both parts of said wire.

11. The combination in a wire-loop-forming mechanism with a pin around which the wire is bent to form the loop, of a movable vise-jaw, a support, a fixed vise-jaw, a support for said fixed jaw, a rock-shaft vibrating in said support, an arm on said rock-shaft, and a pin on said arm; the said last-named pin being constructed and operating to engage with said wire and bend the same and carry the bent-over part between said jaws of said vise.

12. In a machine for making wire bale-ties, in combination with clamping means for said wire and mechanism constructed to form an engaging part of the tie from the part of said wire protruding beyond said clamping means, means for regulating the extent of protrusion of said wire.

13. In a machine for making wire bale-ties, in combination with clamping means for said wire and mechanism for bending the part of said wire protruding beyond said clamping means, means for regulating the extent of protrusion of said wire.

14. In a machine for making bale-ties, in combination with a clamping means for the wire and a loop-forming mechanism constructed to act upon the part of said wire protruding beyond said clamping means, means for regulating the extent of protrusion of said wire.

15. In a machine for making wire bale-ties, in combination with clamping means for said wire, and a loop-forming mechanism constructed to act upon the wire protruding beyond said clamping means, means for feeding successive wires to said clamping means, and means for equalizing the extent of protrusion of said wires from said clamping means and toward said loop-forming mechanism.

16. In a machine for making wire bale-ties, a support for the wire, mechanism for forming an engaging part of the tie on the protruding portion of said wire, and a moving device acting upon said portion to regulate the extent of said protrusion.

17. In a machine for making bale-ties, mechanism for forming an engaging part of the tie, a movable support for conveying said wire laterally to said forming mechanism, and a moving device acting upon the portion of said wire protruding from said support toward said forming mechanism to regulate the extent of said protrusion.

18. In a machine for making wire bale-ties, means for forming loops on the ends of the tie-wires, means for conveying the said wires laterally and successively to said loop-forming mechanism, and means interposed between said conveying device and said loop-forming mechanism for equalizing the extent of protrusion of said wires from said conveying device toward said loop-forming mechanism 19. In a machine for making wire bale-ties, means for forming loops on the ends of the tie-wires, a plurality of intermittently-rotating wheels having recesses on their circumferences constructed to receive said wires in successive recesses and to carry the same to said loop-forming mechanism, and means for moving said wires longitudinally in said recesses.

20. In a machine for making wire bale-ties, a support constructed to hold a tie-wire free at both ends therein, mechanism for forming an engaging part of the tie on one end of said wire, and means for moving said wire longitudinally in said support.

21. In a machine for making wire bale-ties, mechanism for forming an engaging part of the tie on the ends of said wires, a support constructed to hold a plurality of tie-wires free at both ends therein and for conveying said wires laterally and successively to said forming mechanism, and means for moving said wires longitudinally in said support.

22. In a machine for making wire bale-ties, a support constructed to hold a tie-wire free at both ends therein, mechanism for forming an engaging part of the tie on a protruding portion of said wire, and a moving device acting upon said portion to move said wire longitudinally in said support.

23. In a machine for making wire bale-ties, a support constructed to hold a tie-wire free at both ends therein, mechanism for forming an engaging part of said tie at one end of said wire, means for moving said wire longitudinally in said support, and means for frictionally retarding the longitudinal motion of said wire.

24. In a machine for making wire bale-ties, a support constructed to hold a tie-wire free at both ends therein, mechanism for forming an engaging part of said tie at one end of said wire, means for moving said wire longitudinally in said support, and a clamping device for frictionally retarding the longitudinal motion of said wire.

25. In a machine for making wire bale-ties, mechanism for forming an engaging part of the tie on the ends of said wires, a support having recesses constructed to receive loosely a plurality of said tie-wires and to convey said wires successively to said forming mechanism, means for regulating the extent of protrusion of said tie-wires from said support, and means operating coincidently with said regulating mechanism for retaining the wire next preceding that subjected to the said forming mechanism in its recess in said support.

26. In a machine for making wire bale-ties, a rotary loop-forming head, a support therefor, means for moving said support in the direction of the axis of rotation of said head, a fixed plate on said support, and a device for conveying the tie-wires laterally and successively to said head; the said plate being constructed and arranged when said head is moved longitudinally into operating position, to strike the end of the wire in said conveying device which next precedes that engaged by said head, and to move said wire longitudinally in said conveying device.

27. The combination in a machine for making wire bale-ties, with mechanism for forming an engaging part of the tie and a vise having a movable jaw for holding the tie-wire during said forming operation, of a conveying device receiving said wires loosely in recesses and delivering them to said vise and forming mechanism, and means actuated by said movable vise-jaw for holding the tie-wire, next preceding the tie-wire in said vise, in its recess on said conveying device.

28. The combination in a machine for making wire bale-ties, with mechanism for forming an engaging part of said tie and a vise having a vertically-movable jaw for holding the tie-wire during the forming operation, of a rotary conveying device receiving said wires loosely in recesses and delivering the same to said vise and forming mechanism, and a spring presser-foot carried by said movable vise-jaw for holding the tie-wire next preceding the tie-wire in said vise in its recess in said conveying device.

29. The combination in a machine for making wire bale-ties, with mechanism for forming an engaging part of the tie, and a vise having a movable jaw for holding the tie-wire during said forming operation, of a conveying device receiving said wires loosely in recesses and delivering them laterally to said vise and forming mechanism, means actuated by said movable vise-jaw for holding the tie-wire next preceding the tie-wire in said vise in its recess in said conveying device, and means acting upon the said held tie-wire for moving the same longitudinally in said conveying device.

30. In a machine for making wire bale-ties, mechanism for forming an engaging part of said tie on the ends of the tie-wires, a support having recesses constructed to receive loosely a plurality of said tie-wires and to convey said tie-wires successively to said forming mechanism, means for regulating the extent of protrusion of said tie-wires from said support, and means operating intermittently and coincidently with said regulating means for preventing the tie-wire next preceding that subjected to the action of said forming mechanism from leaving its recess in said support.

31. In a machine for making wire bale-ties, mechanism for forming an engaging part of said tie on the ends of the tie-wires, a support constructed to receive loosely a plurality of said tie-wires and to convey said tie-wires successively to said forming mechanism, and means for preventing the tie-wire next preceding that subjected to the action of said forming mechanism from leaving said support during the aforesaid action of said forming mechanism.

32. In a machine for making wire bale-ties, a feeding device for the wire constructed to grip the same, means for cutting the wire into tie lengths, and means for relaxing the grip of the feeding device during the operation of said cutting means.

33. In a machine for making wire bale-ties, a feeding device for the wire constructed to grip the same, means for cutting the wire into tie lengths, a tubular guide for the wire interposed between said feeding device and said cutting means, and means for relaxing the grip of the feeding device during the operation of said cutting means.

34. In a machine for making wire bale-ties, a fixed rotary feed-roll, a loose rotary feed-roll resting thereon and receiving motion from said lower roll, means for automatically producing a normal pressure of said upper roll on said lower roll, and means for varying the said pressure.

35. In a machine for making wire bale-ties, a fixed rotary feed-roll, a loose rotary feed-roll resting thereon and receiving motion from said lower roll, means for varying the normal pressure of said upper roll on said lower roll, and automatic means for intermittently relieving said pressure.

36. In a machine for making wire bale-ties, a fixed rotary feed-roll, a loose rotary feed-roll resting thereon and receiving motion from said lower roll, a cutting mechanism for the wire fed by said rolls, and means for relieving the normal pressure of said upper roll on said lower roll during the operation of said cutting mechanism.

37. In a machine for making wire bale-ties, feed-rolls for the wire, a cutting-off mechanism, and means for relieving the pressure exerted by said rolls on said wire during the operation of said cutting mechanism.

38. In a machine for making wire bale-ties, lower feed-rolls, supports in which said rolls are journaled, upper feed-rolls loosely disposed between said supports, gearing between said lower and upper rolls, bars pivoted at one end extending over said upper feed-rolls, means for adjusting the normal pressure of said bars on said rolls, and means for intermittently relieving said pressure.

39. In a machine for making wire bale-ties, lower feed-rolls, supports in which said rolls are journaled, upper feed-rolls loosely disposed between said supports, gearing between said lower and upper rolls, bars pivoted at one end and curved to extend over said upper feed-rolls, rollers in said bars bearing on said upper rolls, a vertical pin loose in the end of each bar, a fixed abutment above said pin, and a spring between a flange on said pin and said bar.

40. In a machine for making wire bale-ties, lower feed-rolls, supports in which said rolls are journaled, upper feed-rolls loosely disposed between said lower and upper rolls, bars pivoted at one end and curved to extend over said upper feed-rolls, rollers in said bars bearing on said upper rolls, a vertical pin loose in the end of each bar, a spring on said bar for holding said pin in raised position, a cam operating on the head of said pin, and means for intermittently operating said cam to force said pin downwardly against the action of said spring and thereby to press said rollers against said upper feed-rolls.

41. In a machine for making wire bale-ties, a smooth feed-roll, a toothed gear parallel thereto and formed integral therewith, a shaft on which said roll and gear are fixed, standards in which said shaft is journaled, means for rotating said shaft, a second smooth feed-roll and a toothed gear parallel thereto and formed integral therewith; the said second roll being placed closely between said standards above said first roll with the gears of said rolls engaging one with the other, and means for holding said loose roll and gear in position above said journaled roll and gear.

42. In a machine for making wire bale-ties, a rock-shaft, means for gripping a plurality of wires and feeding the same to the cutting-blades, and means controlled by said rock-shaft for relaxing the grip of said feeding means on said wires; the aforesaid parts being constructed and timed so that the relaxation of the feed-grip synchronizes with the cutting movement of the blades.

43. In a cutting-off mechanism for bale-tie wires, a reciprocating bar, a pivoted blade-carrying lever actuated thereby, and means on said bar for regulating the throw of said blade.

44. In a cutting-off mechanism for bale-tie wires, a longitudinally-reciprocating bar, a block therein having a recess on its lower side, a pivoted blade-carrying lever having one end entering said recess, and means for adjusting said block in a direction longitudinally of said bar.

45. In a cutting-off mechanism for bale-tie wires, a longitudinally-reciprocating bar, a plurality of blocks therein having recesses, a plurality of pivoted blade-carrying levers having their ends entering said recesses, and means for independently adjusting each of said blocks in a direction longitudinally of said bar.

46. In a machine for making wire bale-ties, in combination with means for cutting the strands into tie-wires, a plurality of endless conveyers having projections and intervening recesses constructed to receive said wires, and means for actuating said conveyers to carry said wires successively and laterally away from said cutting means.

47. In a machine for making wire bale-ties, in combination with cutting mechanism and guides receiving the cut-off tie-wires and constructed to open to permit said wires to drop, a plurality of endless conveyers having projections and intervening recesses constructed to receive said wires, and means for actuating said conveyers to carry said wires successively and laterally away from the guides.

48. In a machine for making wire bale-ties, in combination with means for cutting the strands into tie-wires, a plurality of endless conveyers having projections and intervening recesses constructed to receive said wires, means for actuating said conveyers to move said wires successively and laterally, fixed inclined guides for receiving said wires from said conveyers, and means for receiving said wires from said guides and adjustable to divert said wires out of the machine.

49. In a machine for making wire bale-ties, in combination with means for cutting the strands into tie-wires, a plurality of endless conveyers having projections and intervening recesses constructed to receive said wires, fixed tables disposed within said conveyers and constructed to support their receiving portions, and means for actuating said conveyers to move said wires successively and laterally away from said cutting mechanism.

50. In a machine for making wire bale-ties, a cutting-off mechanism, a mechanism for forming an engaging part of the tie, and means interposed between said mechanisms for diverting the cut-off wires away from said forming mechanism, at will.

51. In a machine for making wire bale-ties, a cutting-off mechanism, a mechanism for forming an engaging part of the tie, and means interposed between said mechanisms adjustable to divert the cut-off wires to or away from said forming mechanism, at will.

52. In a machine for making wire bale-ties, a cutting-off mechanism, a mechanism for forming an engaging part of the tie, means for conveying the tie-wires from said cutting mechanism, and pivoted arms receiving said wires from said conveying means; the said arms being adjustable to divert said wires to or away from said forming mechanism, at will.

53. In a machine for making wire bale-ties, a cutting-off mechanism, a mechanism for forming an engaging part of the tie, a conveying device for carrying the tie-wires from said cutting mechanism, a conveying device for carrying the wires to said forming mechanism, and, between said conveying devices, means for diverting the wires from said first-named conveying device to said second conveying device or from said first-named conveying device out of the machine.

54. In a machine for making wire bale-ties, a cutting-off mechanism, an endless conveyer receiving the tie-wires therefrom, pivoted arms receiving said wires from said endless conveyer, wheel-conveyers receiving said wires from said arms, and a loop-forming mechanism receiving said wires from said wheel-conveyers; the said arms being adjustable to divert said wires away from said loop-forming mechanism.

55. In a machine for making wire bale-ties, a cutting-off mechanism, mechanism for forming the engaging part of the tie, means interposed between said mechanisms for diverting the cut-off wires away from said forming mechanism at will, driving mechanism, and means for disconnecting said forming mechanism from said driving mechanism.

56. In a machine for making wire bale-ties, a driving mechanism, means for forming the engaging part of the tie, and means for independently disconnecting said forming means from the said driving mechanism.

57. In a machine for making wire bale-ties, a driving mechanism, means for forming the engaging part of the tie, means for independently disconnecting said forming means from the driving mechanism, and means for arresting the inertia movement of said forming means.

58. In a machine for making wire bale-ties, a driving mechanism, a rotary twisting-head, a shaft therefor actuated by said driving mechanism, a brake acting on said shaft, means for disconnecting said shaft from said driving mechanism, and means for applying said brake.

59. In a machine for making bale-ties, a rotary twisting-head, gearing for actuating the same, means for intermittently arresting the rotation of said head, and means for simultaneously arresting the movement of said gearing due to its own inertia.

60. In a machine for making bale-ties, a rotary twisting-head, a shaft therefor, a pinion on said shaft, a toe-cam on said shaft, a second shaft, a loose gear on said shaft engaging with said pinion, a segment fixed on said shaft and in the path of rotation of said toe-cam, means for actuating said loose gear, and means for actuating said segment-shaft.

61. In a machine for making bale-ties, a rotary twisting-head, a shaft therefor, a pinion fixed on said shaft, a toe-cam fixed on said shaft, a second shaft, a loose gear on said shaft engaging with said pinion, a segment fixed on said second shaft and in the path of rotation of said toe-cam; means for actuating said segment-shaft, and means for preventing said loose gear from running ahead of said segment by reason of its own inertia.

62. In a machine for making bale-ties, a rotary twisting-head, a shaft therefor, a pinion fixed on said shaft, a toe-cam fixed on said shaft, a second shaft, a loose gear on said shaft engaging with said pinion, a segment fixed on said second shaft and in the path of rotation of said toe-cam, means for actuating said loose gear, means for actuating said segment-shaft, and means carried by said segment for preventing said loose gear from running ahead of said segment by reason of its own inertia.

63. In a machine for making wire bale-ties, in combination with a rotary twisting-head and the shaft thereof, a brake mechanism acting on said shaft, means for intermittently rotating the said twisting-head shaft, and means for intermittently applying said brake to said shaft; the said parts being constructed and timed so that said brake mechanism shall come into operation upon said shaft synchronously with the intermission of operation of the shaft-rotating mechanism.

64. In a machine for making wire bale-ties, in combination with a rotary twisting-head and the shaft thereof, a brake mechanism acting on said shaft, a lever controlling said brake mechanism, a second shaft, a cam on said shaft, a vibrating arm actuated by said cam and itself actuating said brake-lever, and mechanism controlled by said arm for intermittently rotating said twisting-head shaft.

65. In a machine for making wire bale-ties, in combination with a rotary twisting-head and the shaft thereof, a brake mechanism acting on said shaft, a lever controlling said brake mechanism, a second shaft, a cam on said second shaft, a pinion on said second shaft, a vibrating bent arm actuated by said cam and itself actuating said brake-lever, a rack on said arm engaging with said pinion, and mechanism actuated by said pinion for intermittently rotating said twisting-head shaft.

66. In a machine for making wire bale-ties and in combination with the cutting-off mechanism thereof, a continuously-rotating member for actuating the same and means for bringing said cutting mechanism into intermittent engagement with said rotating member.

67. In a machine for making bale-ties and in combination with the cutting-off mechanism thereof, a continuously-rotating member and means actuated thereby for intermittently operating said cutting-off mechanism.

68. In a machine for making bale-ties and in combination with the cutting-off mechanism thereof, a continuously-rotating member and means controlled thereby for actuating said cutting-off mechanism once during a predetermined number of revolutions of said member.

69. In a machine for making wire bale-ties and in combination with the cutting-off mechanism thereof, means for operating said cutting-off mechanism, a continuously-rotating member, and means for bringing said cut-off operating mechanism into engagement with said member at predetermined intervals of time.

In testimony whereof I have signed my name to this specification in the presence of two subscribing witnesses.

WILLIAM D. FERRIS.

Witnesses:
   WM. H. SIEGMAN,
   GERTRUDE T. PORTER.